US009849926B2

(12) United States Patent
Saunders et al.

(10) Patent No.: US 9,849,926 B2
(45) Date of Patent: Dec. 26, 2017

(54) PREDICTIVELY ADJUSTABLE HYDRAULIC PRESSURE RAILS

(71) Applicant: Google Inc., Mountain View, CA (US)

(72) Inventors: John Aaron Saunders, Arlington, MA (US); Michael Murphy, Arlington, MA (US); Steven D. Potter, Bedford, MA (US)

(73) Assignee: Boston Dynamics, Inc., Waltham, MA (US)

( * ) Notice: Subject to any disclaimer, the term of this patent is extended or adjusted under 35 U.S.C. 154(b) by 142 days.

(21) Appl. No.: 14/339,267

(22) Filed: Jul. 23, 2014

(65) Prior Publication Data
US 2016/0023699 A1 Jan. 28, 2016

(51) Int. Cl.
*B62D 57/032* (2006.01)
*B25J 18/00* (2006.01)
(Continued)

(52) U.S. Cl.
CPC .......... *B62D 57/032* (2013.01); *B25J 18/00* (2013.01); *F15B 21/001* (2013.01); *G05D 1/021* (2013.01);
(Continued)

(58) Field of Classification Search
CPC .... B62D 57/02; B62D 57/024; B62D 57/032; G05D 16/2006; G05D 16/2066;
(Continued)

(56) References Cited

U.S. PATENT DOCUMENTS 3,815,622 A 6/1974 Allen
3,939,610 A * 2/1976 Suzuki .................. B24B 49/16
451/11
(Continued)

FOREIGN PATENT DOCUMENTS

EP 0207625 A2 * 1/1987 ............ B25J 13/085
EP 0035282 B1 7/1987
(Continued)

OTHER PUBLICATIONS

Bauchspiess, "Predictive Sensor Guided Robotic Manipulators in Automated Welding Cells," Journal of Materials Processing Technology, vol. 109, pp. 13-19, 2001.
(Continued)

*Primary Examiner* — S. Joseph Morano
*Assistant Examiner* — Maurice L Williams
(74) *Attorney, Agent, or Firm* — Honigman Miller Schwartz and Cohn LLP

(57) ABSTRACT

A robotic device may traverse a path in a direction of locomotion. Sensor data indicative of one or more physical features of the environment in the direction of locomotion may be received. The implementation may further involve determining that traversing the path involves traversing the one or more physical features of the environment. Based on the sensor data indicative of the one or more physical features of the environment in the direction of locomotion, a hydraulic pressure to supply to the one or more hydraulic actuators to traverse the one or more physical features of the environment may be predicted. Before traversing the one or more physical features of the environment, the hydraulic drive system may adjust pressure of supplied hydraulic fluid from the first pressure to the predicted hydraulic pressure.

15 Claims, 15 Drawing Sheets

(51) Int. Cl.
*F15B 21/00* (2006.01)
*G05D 1/02* (2006.01)
*G05D 16/20* (2006.01)
*F15B 13/04* (2006.01)

(52) U.S. Cl.
CPC ...... *G05D 16/2006* (2013.01); *F15B 13/0406* (2013.01); *F15B 2211/20523* (2013.01); *F15B 2211/20538* (2013.01); *F15B 2211/20576* (2013.01); *F15B 2211/25* (2013.01); *F15B 2211/265* (2013.01); *F15B 2211/5151* (2013.01); *F15B 2211/5152* (2013.01); *F15B 2211/625* (2013.01); *F15B 2211/6309* (2013.01); *F15B 2211/6336* (2013.01); *F15B 2211/6651* (2013.01); *F15B 2211/6653* (2013.01); *G05D 16/2066* (2013.01); *G05D 2201/0217* (2013.01)

(58) Field of Classification Search
CPC .. G05D 1/00; G05D 1/021; G05D 2201/0217; Y10S 901/00
USPC .................................. 901/9, 34, 46; 700/253
See application file for complete search history.

(56) References Cited

U.S. PATENT DOCUMENTS

| | | | |
|---|---|---|---|
| 4,604,561 A * | 8/1986 | Kamajima | G05B 19/4141 318/561 |
| 5,121,805 A * | 6/1992 | Collie | B62D 57/024 180/8.1 |
| 5,218,895 A | 6/1993 | Lukick et al. | |
| 5,484,219 A * | 1/1996 | Drew | B25J 17/0208 403/24 |
| 5,685,383 A | 11/1997 | Ferrante | |
| 5,829,335 A | 11/1998 | Ewald et al. | |
| 6,035,828 A | 3/2000 | Anderson et al. | |
| 6,113,642 A | 9/2000 | Petrofsky et al. | |
| 6,305,163 B1 | 10/2001 | Paakkunainen | |
| 6,748,738 B2 * | 6/2004 | Smith | E02F 9/2217 60/414 |
| 6,938,535 B2 | 9/2005 | Price | |
| 7,729,796 B2 | 6/2010 | Hartrampf et al. | |
| 7,819,183 B2 * | 10/2010 | Borgstadt | B25J 9/1664 166/250.01 |
| 7,831,352 B2 | 11/2010 | Laumer et al. | |
| 8,102,134 B1 | 1/2012 | Theobald | |
| 8,469,424 B2 | 6/2013 | Takenaka et al. | |
| 8,567,185 B1 * | 10/2013 | Theobald | B25J 9/00 60/413 |
| 8,585,776 B2 | 11/2013 | Lind et al. | |
| 8,726,646 B2 | 5/2014 | Riedel et al. | |
| 2002/0022907 A1 * | 2/2002 | Takenaka | B62D 57/02 700/245 |
| 2008/0109115 A1 | 5/2008 | Lim | |
| 2008/0255488 A1 * | 10/2008 | Agrawal | A63B 21/00181 602/23 |
| 2008/0265821 A1 | 10/2008 | Theobald | |
| 2010/0090638 A1 | 4/2010 | Saunders et al. | |
| 2011/0000203 A1 * | 1/2011 | Riedel | F15B 11/163 60/327 |
| 2012/0233997 A1 | 9/2012 | Andruch, III et al. | |
| 2012/0291873 A1 | 11/2012 | Potter et al. | |
| 2012/0303162 A1 * | 11/2012 | Orita | B25J 9/1664 700/275 |
| 2013/0238183 A1 | 9/2013 | Goulding | |

FOREIGN PATENT DOCUMENTS

| | | | |
|---|---|---|---|
| JP | 2005052896 A | * | 3/2005 |
| JP | 2009072839 A | * | 4/2009 |

OTHER PUBLICATIONS

Sepehri, et al., "Experimental Evaluation of Generalized Predictive Control Applied to a Hydraulic Actuator," Robitica, vol. 16, pp. 463-474, 1998.
Bauchspiess et al., "Predictive sensor guided robotic manipulators in automated welding cells,", Journal of Materials Processing Technology, 109, pp. 13-19, (2001).
Hu et al., "Generalized predictive control of an industrial mobile robot," Proceeds of the IASTED International Conference, (1999).
azorobotics.com, "Pneumatic and Hydraulic Actuators", 2014.
Ponomareva, "Hydraulic and Pneumatic Actuators and their Application," Mechatronics, (2006).
Sepehri et al., "Experimental evaluation of generalized predictive control applied to a hydraulic actuator," Cambridge Journals Online, 16, pp. 463-474, (1998).
Andruch, et al., Design, Simulation and Control of Hydraulic System Topographies with Integrated Energy Recovery, National Fluid Power Association, Oct. 2011, 13 pages.
azorobotics.com, "Pneumatic and Hydraulic Actuators", 2014, pp. 1-4.
Hu et al., "Generalised Predictive Control of an Industrial Mobile Robot," Proceeds of the IASTED International Conference, Intelligent Systems and Control, Oct. 28-30, 1999, pp. 235-240.
Ponomareva, Elena, "Course 5: Mechatronics—Foundations and Applications, Hydraulic and Pneumatic Actuators and their Application," Mechatronics, May 26, 2006, pp. 1-24.
Shen, et al., "Energy-Saving Analysis of Hydraulic Hybrid Excavator Based on Common Pressure Rail," The Scientific World Journal, 2013, vol. 2013, pp. 1-12.
International Bureau, International Preliminary Report on Patentability dated Feb. 2, 2017, issued in connection with International Application No. PCT/US2015/039322, filed on Jul. 7, 2015, 7 pages.

* cited by examiner

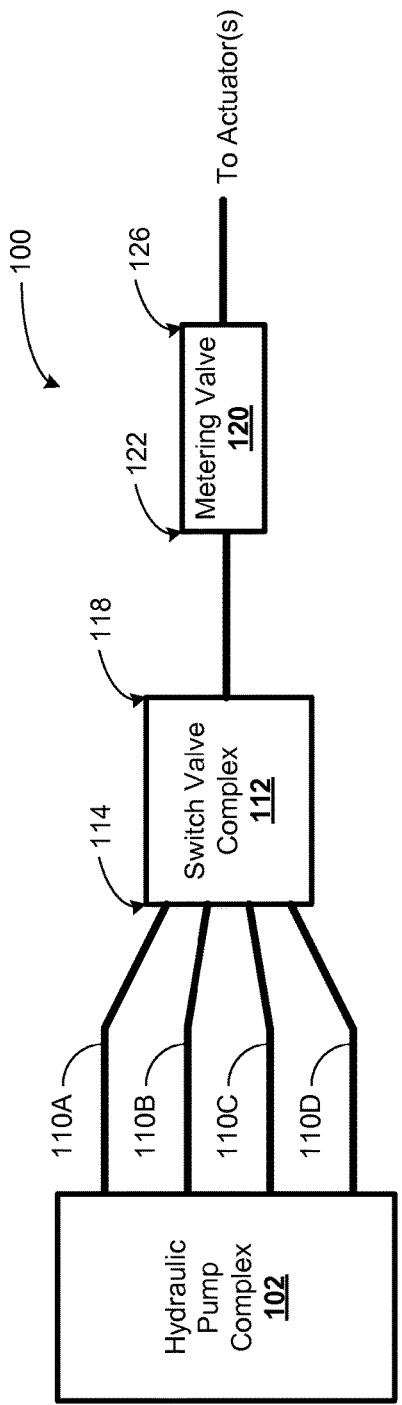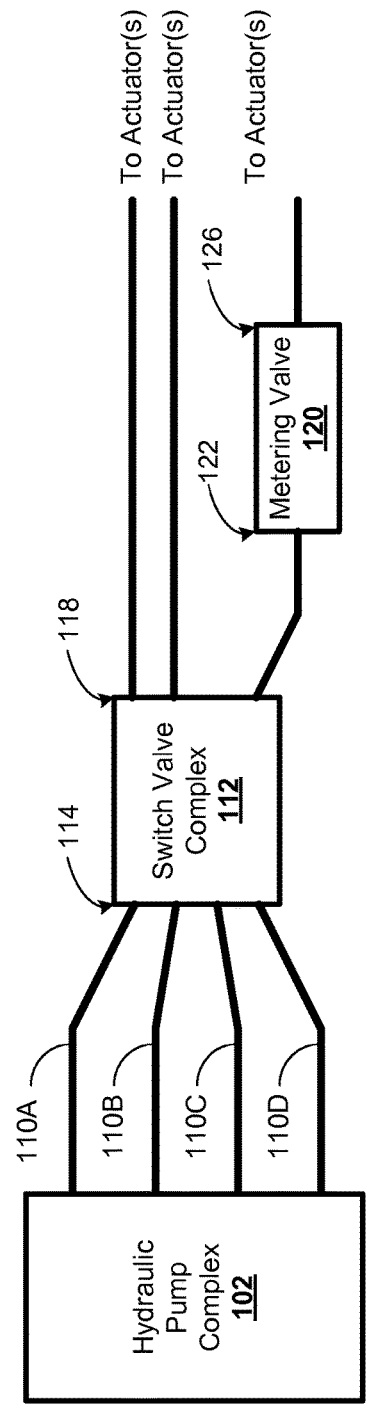
Fig. 2A
Fig. 2B

PREDICTIVELY ADJUSTABLE HYDRAULIC PRESSURE RAILS

BACKGROUND

A robotic device, such as a legged robot, may have a hydraulic drive system which, in operation, supplies pressurized hydraulic fluid to hydraulic actuators on the robotic device. For instance, the robotic device may have robotic arms and/or legs driven by linear hydraulic actuators (e.g., hydraulic piston-cylinder assemblies). Pressurized hydraulic fluid may cause the linear hydraulic actuators to actuate and thereby move the robotic arms and/or legs. An example legged robot may have one or more hydraulic actuators on each leg (e.g., hip, knee, and ankle actuators). A pump of the hydraulic drive system may pressurize hydraulic fluid. The hydraulic drive system may supply the pressurized hydraulic fluid to the hydraulic actuators on each leg.

SUMMARY

In an example implementation, a robotic device may include at least one sensor configured to generate data indicative of an environment in which the robotic device is operating. The robotic device may also include a hydraulic drive system that includes a first pressure rail, a second pressure rail, and a hydraulic pump complex configured to provide pressurized hydraulic fluid at a fixed pressure to the first pressure rail and pressurized hydraulic fluid at an adjustable pressure to the second pressure rail. The robotic device may further include a control system configured to vary the adjustable pressure provided by the hydraulic pump complex based on at least the data indicative of the environment in which the robotic device is operating. The robotic device may also include a switch valve complex that includes hydraulic fluid inputs, where the hydraulic fluid inputs comprise a first hydraulic fluid input coupled to the first pressure rail and a second hydraulic fluid input coupled to the second pressure rail, a hydraulic fluid output, and a hydraulic fluid switch that selectively connects one of the hydraulic fluid inputs to the hydraulic fluid output.

In another example implementation, a robotic device may traverse a path in a direction of locomotion, where the robotic device traversing the path may involve causing a hydraulic drive system to supply hydraulic fluid at a first pressure to one or more hydraulic actuators. Sensor data indicative of one or more physical features of the environment in the direction of locomotion may be received. The implementation may further involve determining that traversing the path involves traversing the one or more physical features of the environment. Based on the sensor data indicative of the one or more physical features of the environment in the direction of locomotion, a hydraulic pressure to supply to the one or more hydraulic actuators to traverse the one or more physical features of the environment may be predicted. Before traversing the one or more physical features of the environment, the hydraulic drive system may adjust pressure of the supplied hydraulic fluid from the first pressure to the predicted hydraulic pressure.

Another example implementation may include a means for causing a robotic device to traverse a path in a direction of locomotion, where causing the robotic device to traverse the path may involve causing a hydraulic drive system to supply hydraulic fluid at a first pressure to one or more hydraulic actuators. The implementation may also include a means for receiving sensor data indicative of one or more physical features of the environment in the direction of locomotion. The implementation may further include a means for determining that traversing the path involves traversing the one or more physical features of the environment. The system may include a means for predicting a hydraulic pressure to supply to the one or more hydraulic actuators to traverse the one or more physical features of the environment based on the sensor data indicative of the one or more physical features of the environment in the direction of locomotion. The system may also include a means for adjusting pressure of the supplied hydraulic fluid from the first pressure to the predicted hydraulic pressure before traversing the one or more physical features of the environment.

In yet another example implementation, a robotic device may perform a task that involves actuating one or more hydraulic actuators, where causing the robotic device to perform the task may involve causing a hydraulic drive system to supply hydraulic fluid at a first pressure to the one or more hydraulic actuators. Responsive to the robotic device performing the task, over a pre-determined period of time, respective loads on the one or more hydraulic actuators in performing a portion of the task may be tracked. Based on the tracked respective loads, the implementation may involve determining that actuating the one or more hydraulic actuators involves a second pressure that is different than the first pressure. Responsive to the determination, the hydraulic drive system may adjust pressure of the supplied hydraulic fluid from the first pressure to the second pressure.

Another example implementation may include a means for causing the robotic device to perform a task that involves actuating one or more hydraulic actuators, where causing the robotic device to perform the task may involve causing a hydraulic drive system to supply hydraulic fluid at a first pressure to the one or more hydraulic actuators. The implementation may also include a means for tracking, over a pre-determined period of time, respective loads on the one or more hydraulic actuators in performing a portion of the task in response to the robotic device performing the task. The implementation may further include a means for determining that actuating the one or more hydraulic actuators involves a second pressure that is different than the first pressure based on the tracked respective loads. The implementation may also include a means for causing the hydraulic drive system to adjust pressure of the supplied hydraulic fluid from the first pressure to the second pressure in response to the determination.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 2A is a simplified block diagram illustrating hydraulic fluid interconnections between components of the example hydraulic drive system.

FIG. 2B is a simplified block diagram illustrating alternative hydraulic fluid interconnections between components of the example hydraulic drive system.

DETAILED DESCRIPTION

Figure 1:
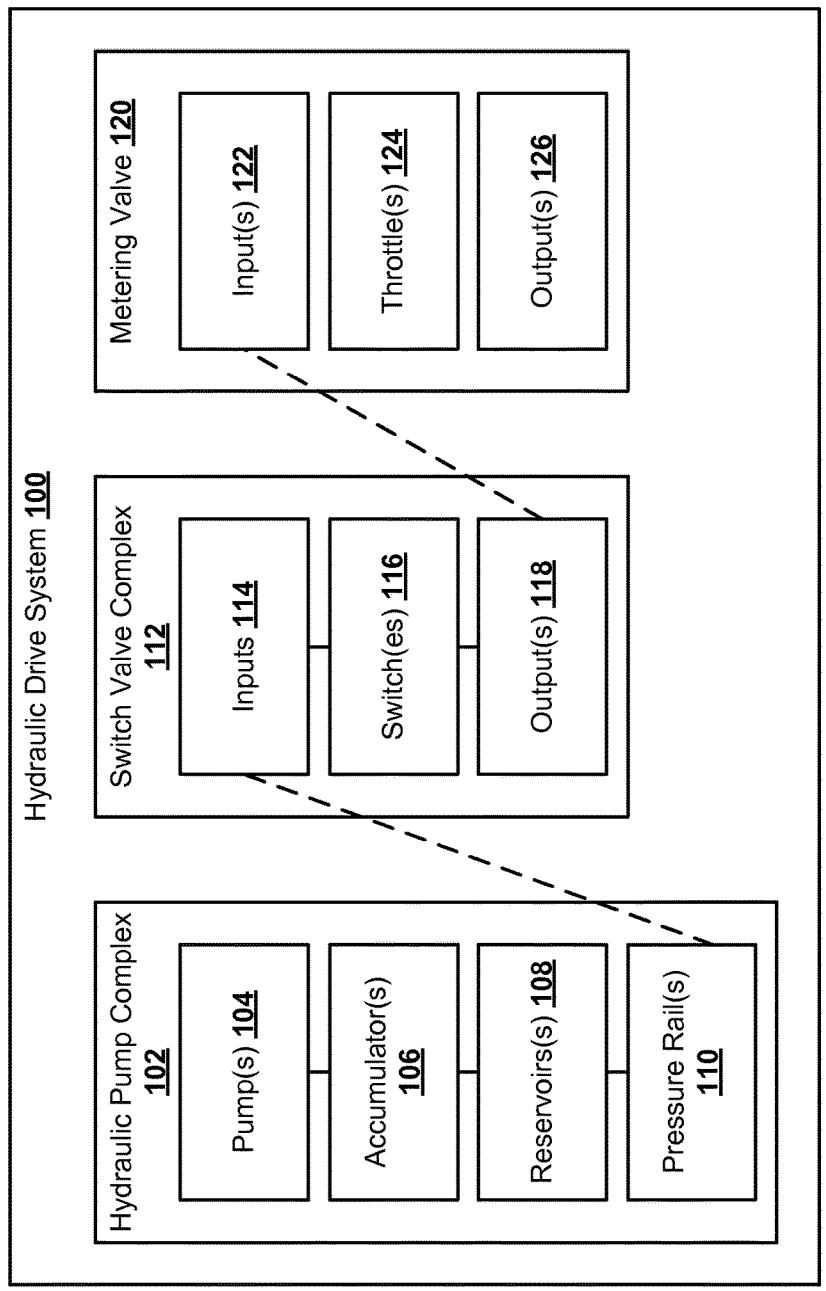
FIG. 1 is a simplified block diagram illustrating components of an example hydraulic drive system.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the figures should not be viewed as limiting. Other implementations might include more or less of each element shown in a given figure. Further, some of the illustrated elements may be combined or omitted. Yet further, an example implementation may include elements that are not illustrated in the figures.

Example implementations may involve hydraulic-driven robotic devices that may predict one or more desired pressure levels and then adjust the pressurized hydraulic fluid output of a hydraulic drive system to the predicted one or more pressure levels. An example robotic device may include limbs (e.g., arms or legs) that articulate by way of hydraulic actuators. In operation, pressurized hydraulic fluid supplied from one or more pressure rails (e.g., pipes or hoses) may cause these hydraulic actuators to actuate and thus move the arms (e.g., to pick up objects) or the legs (e.g., to walk or run). In response to varying loads, the hydraulic drive system may vary the pressure of the hydraulic fluid at the pressure rails to maintain sufficient pressure for requested force and velocity to actuate the load at a particular rate. The hydraulic drive system may attempt to maintain sufficient pressure while limiting the amount of excess pressure produced, which may reduce waste from supplying a pressure that produces a force greater than requested.

In operation, the hydraulic drive system may pressurize hydraulic fluid at one or more pressure rails to respective nominal pressures. In some cases, the nominal pressures may be set at higher pressure levels than necessarily required, as the desired pressure involved in actuating the hydraulic actuators at any point during operation might not be known until the moment of actuating a particular load. Further, increasing a nominal pressure during operation might not be an instantaneous operation. Therefore, setting the nominal pressure too low creates the potential for insufficient pressure to be available to the hydraulic actuators (at least until nominal pressure can be increased). In contrast to increasing the nominal pressure, metering the nominal pressure down to the desired pressure may be a relatively quicker operation. Therefore, a trade-off may be made—higher energy consumption (due to a higher nominal pressure) in exchange for greater flexibility in pressure level.

In some cases, predicting one or more desired pressure levels and adjusting the pressurized hydraulic fluid output to the predicted one or more pressure levels may improve efficiency of the hydraulic drive system, as the predicted one or more pressure levels may be lower than the nominal pressure levels. In that case, adjusting the pressurized hydraulic fluid output to the predicted one or more pressure levels may lengthen the running time of the robotic device and/or lower noise output, among other possible benefits.

The example robotic device may further include various sensors, which may facilitate predicting the desired pressure level. For instance, an example robotic device traversing a path may "look-ahead" in the path by way of one or more perception sensors that may sense physical features of the environment. The robotic device may then predict a hydraulic pressure to supply to one or more hydraulic actuators to traverse the physical features.

An example robotic device may also have one or more sensors that sense various operating parameters of the robotic device. For instance, the robotic device may also have force sensors that indicate load(s) on the hydraulic actuators. The robotic device may track these loads over a pre-determined period of time, determine that actuating these loads involves a lower pressure than the nominal pressure, and predict that actuating future loads will involve the lower pressure. The hydraulic drive system may then adjust pressure at a pressure rail to the lower pressure.

Further, the robotic device may predict desired pressure based on a task that it has been commanded to perform. In one instance, the robotic device may receive a command instructing the robotic device to run at a particular speed—and then the robotic device may predict the desired hydraulic pressure based on a running gait and the particular speed. In another instance, the robotic device may receive a command instructing the robotic device to pick up an object—and then the robotic device may predict the desired hydraulic pressure based on the task of picking up an object.

In some cases, the robotic device may predict the desired pressure based a combination of the data indicating one or more physical features of the environment, the data indicating load on the hydraulic actuators, and the task that the robotic device has been commanded to perform. For instance, the robotic device may receive a command instructing the robotic device to walk to a particular location (perhaps indicated by Global Positioning System coordinates) at five kilometers per hour. After receiving this instruction, the robotic device may determine a path from its current location to the particular location. Based on the determined path, the robotic device may "look-ahead" on the path by way of one or more perception sensors that may sense one or more physical features of the path. Based on the command and the one or more physical features of the path, the robotic device may predict a first pressure, and then adjust a pressure rail to the first pressure.

Then, over a portion of the path, the robotic device may track load on the hydraulic actuators by way of one or more force sensors. The robotic device may evaluate the tracked loads, predict a second pressure based on the tracked loads, and then adjust the pressure rail to the second pressure.

Further, as the robotic device continues to traverse the path, the robotic device may periodically "look-ahead" on the path and may also periodically evaluate tracked loads in order to predict new pressures at which to adjust the pressure rail.

Referring now to the figures, FIG. 1 is a simplified block diagram illustrating components of an example hydraulic drive system 100. Hydraulic drive system 100 includes a hydraulic pump complex 102, a switch valve complex 112, and a metering valve 120. The hydraulic pump complex may connect to the switch valve complex, which may in turn connect to the metering valve.

The hydraulic pump complex 102 may include one or more pumps 104, one or more accumulators 106, one or more reservoirs 108, and two or more pressure rails 110. In operation, the hydraulic pump complex 102 may provide a source of pressurized hydraulic fluid including pressure rails at respective pressures. For instance, the hydraulic pump complex 102 may provide two, three, four, or five pressure rails. Additional pressure rails may be included to provide greater granularity of available pressure levels, but providing additional pressure rails at different pressures may cause the hydraulic drive system to use more energy.

The one or more pumps 104 may support pressurizing hydraulic fluid to a particular pressure (e.g., 3000 PSI). A motor, such as fuel-powered internal combustion engine, may drive the one or more pumps 104. A control system may vary the speed of the motor, thereby varying the speed of the one or more pumps 104, which results in increased or decreased pressure of the pumped hydraulic fluid.

The hydraulic pump complex 102 may include a multi-pressure valve (not shown) connected between the one or more pumps 104 (e.g., a fixed displacement pump that provides a constant pressure) and the two or more pressure rails 110. Each pressure rail (e.g., a tube or pipe) of the two or more pressure rails 110 may connect to a respective one of the one or more accumulators 106. In operation, a control system may cause the multi-pressure valve to selectively connect the one or more pumps 104 to each of the two or more pressure rails 110 for a period of time (e.g., 100 milliseconds). While a pressure rail is connected to the pump, pressurized hydraulic fluid may flow from the pump to the pressure rail. Some pressurized hydraulic fluid may be stored in the respective accumulator for the pressure rail.

The multi-pressure valve may vary the pressure of the pressure rail by varying how often the fixed displacement pump is connected to the pressure rail. More frequent connections from the fixed displacement pump to the pressure rail result in a higher pressure at the pressure rail, as more pressurized fluid flows to the pressure rail. Conversely, less frequent connections from the fixed displacement pump to the pressure rail result in a lower pressure at the pressure rail. For instance, every 1.5 seconds, the multi-pressure valve may connect a first pressure rail for 800 ms, a second pressure rail for 400 ms, a third pressure rail for 200 ms, and a fourth pressure rail for 100 ms, which may result different pressures at the respective pressure rails.

As noted above, multi-pressure valve may vary the pressure of the pressure rail by varying how often one or more pumps 104 are connected to the pressure rail. As pressurized hydraulic fluid flows from the pressure rails to other components of the hydraulic drive system, the control system may maintain the pressure rails at different pressures by adjusting how frequently the one or more pumps 104 are connected to any pressure rail. The respective accumulator for the pressure rail may maintain the pressure of the pressure rail while pressurized hydraulic fluid is still available in the accumulator.

For example, respective pressure sensors on the pressure rails may indicate the pressure of each pressure rail. Based on data from a pressure sensor, the control system may detect that the pressure of one of the pressure rails is lower than the nominal pressure of the pressure rail (e.g., that a 3000 PSI pressure rail has dropped to 2950 PSI). In response, the control system may connect the one or more pumps 104 to the pressure rail more often, which may in turn maintain the pressure of the pressure rail and/or replenish pressurized hydraulic fluid in the accumulator. In some cases, such as when the respective accumulators are full, the multi-pressure valve may connect the pump to the one or more reservoirs 108, one of which may be a return reservoir (i.e., a store of hydraulic fluid for the one or more pumps 104). In this manner, the hydraulic pump complex 102 may provide pressurized hydraulic fluid at or approximately at respective pressures.

In some cases, the hydraulic pump complex 102 may provide a constant pressure to one or more first pressure rails and may provide adjustable pressure to one or more second pressure rails. For instance, the hydraulic pump complex 102 may provide a first pressure rail at a first pressure, a second pressure rail at a second, higher pressure, and a third pressure rail that is adjustable, perhaps at pressures higher than the second pressure. Alternatively, the third pressure rail may be adjustable at pressures between the second pressure and the first pressure. Many configurations are possible.

The switch valve complex 112 may include multiple inputs 114, one or more switches 116, and one or more outputs 118. The one or more inputs 114 may connect to respective pressure rails 110 of the hydraulic pump complex 102. In some implementations, a control system may cause the one or more switches 116 to selectively connect one of the one or inputs 114 to a single output of the one or more outputs 118, thereby allowing pressurized hydraulic fluid to flow from the connected pressure rail to the single output, which may then in turn connect to another component of the hydraulic drive system 100. In some cases, the inputs and outputs may reverse operation and become outputs and inputs, respectively. In this configuration, one or more hydraulic actuators connected to the input (previously the output) may push pressurized hydraulic fluid back through the switch valve complex 112 to the respective pressure rails 110, which may result in regenerating some energy. In other implementations, the one or more switches 116 may selectively connect two or more of the multiple inputs 114 to respective outputs of the one or more outputs 118. Such an arrangement may facilitate connecting pressure rails at different pressures to different outputs, which may in turn connect to different hydraulic actuators.

The metering valve 120 includes at least one input 122, at least one throttle 124, and at least one output 126. In operation, the at least one throttle 124 may restrict the flow of hydraulic fluid flowing from the at least one input 122 to the at least one output 126. Such restriction may lower the pressure of the hydraulic fluid. The at least one throttle 124 may be adjustable, such that it may throttle hydraulic fluid flowing from the at least one input 122 to the at least one output 126 by a varying degree. A control system may connect to the at least one throttle 124 and adjust the at least one throttle 124. In some cases, the control system may open the at least one throttle 124 such that the pressure of hydraulic fluid flowing through the at least one throttle 124 is not substantially lowered. In some implementations, the at least one throttle 124 may be an electrically operated valve, such as an electrohydraulic servovalve. The control system may connect to such an electrically operated valve and cause the valve to open or close to various positions.

In some implementations, a control system may operate the hydraulic drive system in either a discrete mode or a continuous mode. In the discrete mode, the control system may disable the throttle 124 and thereby supply pressure to hydraulic actuators at approximately the pressure of the selected pressure rail. In this mode, throttling losses are approximately zero as the throttle 124 is disabled (e.g., the losses may be less than 5% as some losses in various connections and linkages may occur). But, the control system can choose only from the discrete pressure levels. In the continuous mode, the control system enables the throttle 124. Accordingly, in the continuous mode, the control system may cause the throttle 124 to reduce the hydraulic fluid pressure to various levels, which may allow the control system to tune the hydraulic fluid pressure to a specific value or range of values. For example, the control system may determine a pressure at which to actuate a hydraulic actuator based on (i) a load on the actuator and (ii) a rate at which the actuator should operate on the load. The control system may then cause the throttle 124 to reduce the hydraulic fluid pressure to the determined actuation pressure.

FIG. 2A is a simplified block diagram illustrating hydraulic fluid interconnections between components of the example hydraulic drive system 100. Such interconnections are provided by way of example to illustrate possible interconnections between the components. As shown in FIG. 2A, pressure rails 110A, 110B, 110C, and 110D from the hydraulic pump complex 102 connect to the one or more inputs 114 on the switch valve complex 112. The switch(es) 116 of the switch valve complex 112 selectively connect one of pressure rails 110A, 110B, 110C, and 110D to the at least one input 122 of the metering valve 120. The at least one output 126 of the metering valve 120 may in turn connect to one or more respective ports on one or more hydraulic actuators.

FIG. 2B is a simplified block diagram illustrating alternative hydraulic fluid interconnections between components of the example hydraulic drive system 100. As shown in FIG. 2B, pressure rails 110A, 110B, 110C, and 110D from the hydraulic pump complex 102 connect to the one or more inputs 114 on the switch valve complex 112. Two outputs of the one or more outputs 118 from the switch valve complex 112 may connect to hydraulic actuators. One output of the outputs 118 from the switch valve complex 112 may connect to the at least one input 122 of the metering valve 120. The at least one output 126 of the metering valve may connect to one or more hydraulic actuators. In this arrangement, the switch valve complex 112 can selectively connect metered or unmetered rails to the hydraulic actuators.

Figure 3:
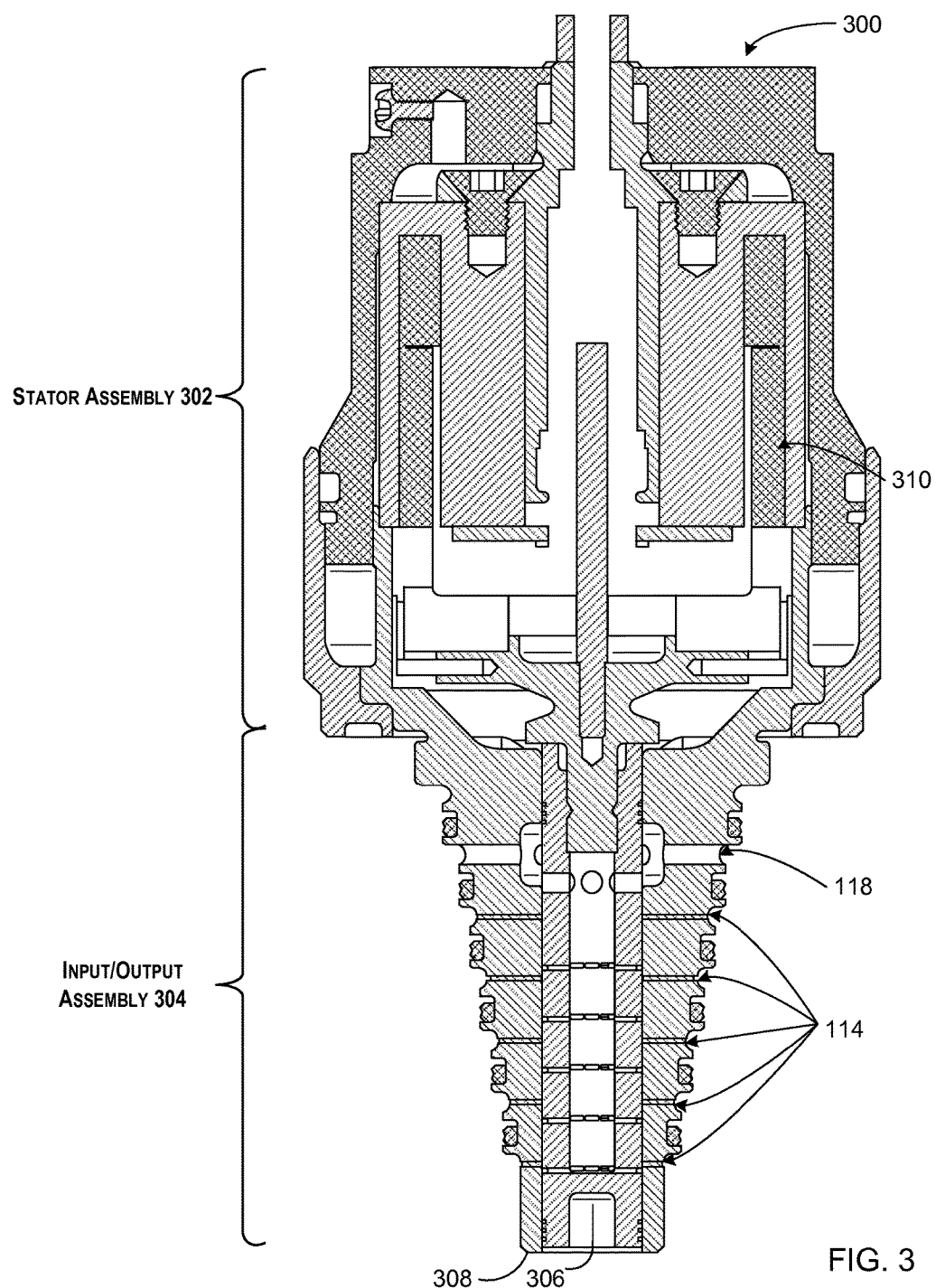
FIG. 3 illustrates an example rotary switch valve.

FIG. 3 illustrates an example rotary switch valve 300 that includes a stator assembly 302 and input/output assembly 304. The switch valve complex 112 may include such a rotary switch valve to connect the inputs 114 to the outputs 118. The stator assembly 302 may include a coil (not shown). Current through the coil may cause a spool 306 of the input/output assembly 304 to rotate within a sleeve 308. Rotation of the spool may connect one or more inputs to one or more outputs of the input/output assembly 304.

Figure 4:
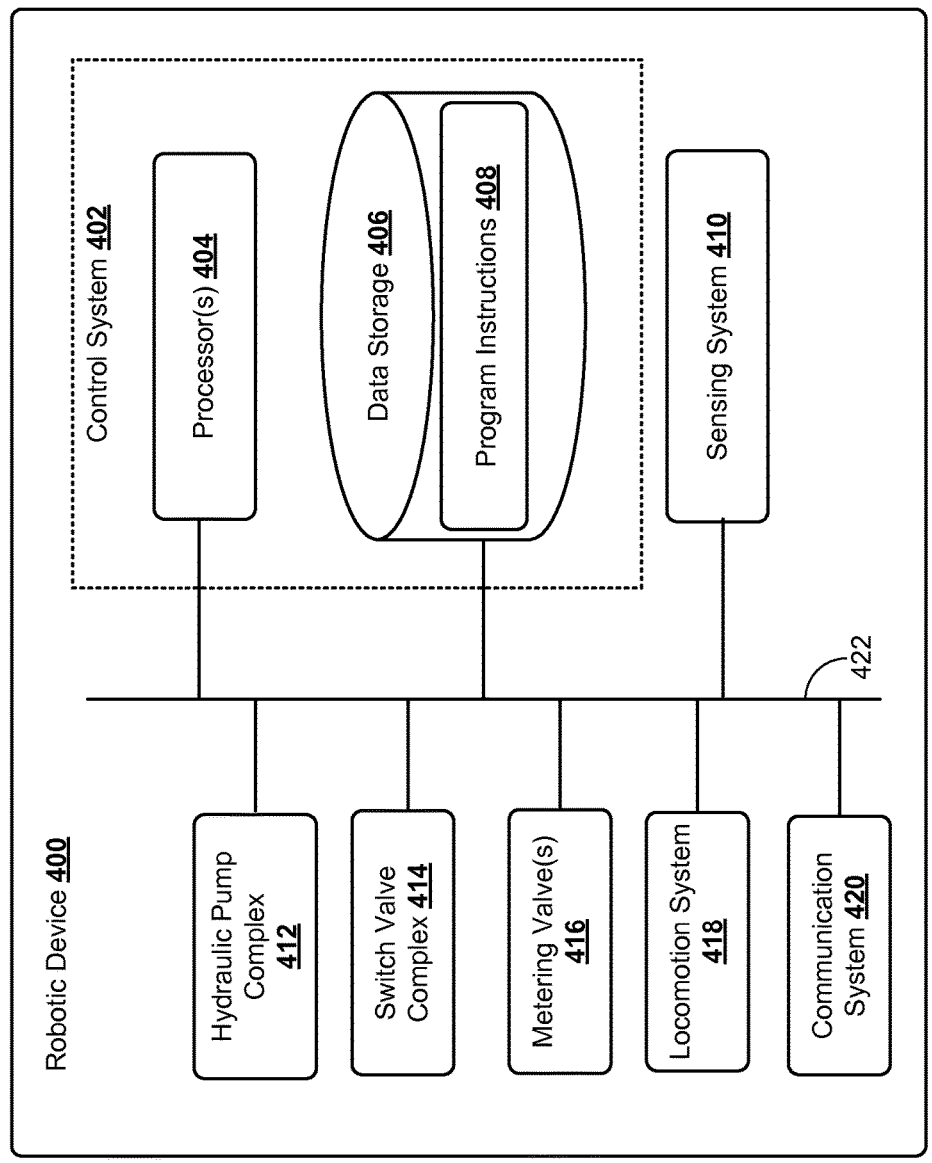
FIG. 4 is a simplified block diagram illustrating components of an example robotic device.

FIG. 4 is a simplified block diagram illustrating components of an example robotic device 400. The robotic device 400 may include a control system 402, a sensing system 410, a hydraulic pump complex 412, a switch valve complex 414, metering valve(s) 416, a locomotion system 418, and a communication system 420. One or more of these components may be interconnected by a bus or other interconnection system 422.

The control system 402 may include one or more processors 404, non-transitory data storage 406, and program instructions 408 stored on the data storage 406. The one or more processors 404 may, for example, include a single or multi-core processor, an application specific integrated circuit (ASIC), field programmable gate array (FPGA), and/or any other suitable circuitry. The program instructions 408 stored on the data storage 406 may be executable by the one or more processors 404 to perform specific functions, which may include the specific functions described herein.

The hydraulic pump complex 412, the switch valve complex 414, and the metering valves 416 may be implemented as the hydraulic pump complex 102, the switch valve complex 112, and the metering valve 120, respectively. However, variations from these examples are possible. The hydraulic pump complex 412, the switch valve complex 414, and the metering valves 416 may function alone or in combination to provide pressurized hydraulic fluid to the locomotion system 418.

The locomotion system 418 may include one or more limbs (e.g., one or more legs and/or one or more arms). In some implementations, the robotic device may be a biped (i.e., a two-legged robot). In other implementations, the robotic device may be a quadruped (i.e., a four-legged robot). In yet further implementations, the robotic device may have three legs or six legs. Many alternatives are possible.

Each leg may be divided into one or more members. The members may be rotably connected at one or more joints (e.g., "ankle," "knee," and/or "thigh" joints). One or more hydraulic actuators may move the one or more members in relation to one another, causing the robotic device to walk or run.

Figure 5A:
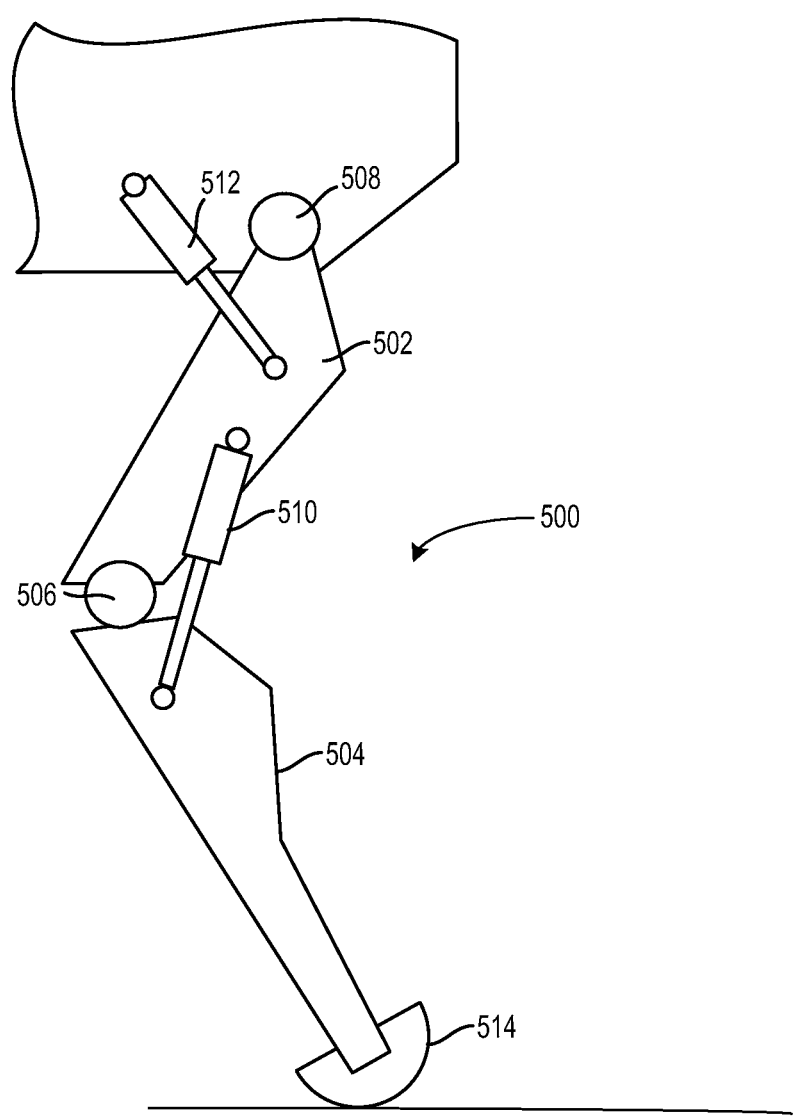
FIG. 5A is a side-view of an example robotic leg in a first arrangement.

FIG. 5A is a side-view of an example articulable robotic leg 500. The robotic leg includes a member 502 having a first end that is connected to the robotic device at joint 508. The member 502 has a second end that is rotably connected to a first end of a member 504 at joint 506. The member 504 has a second end that is connected to a foot member 514. The example robotic leg 500 also includes a linear hydraulic actuator 512 connected between the member 504 and the robotic device. Actuation of the linear hydraulic actuator 512 causes the member 502 and the member 504 to rotate around joint 508. Similarly, actuation of the linear hydraulic actuator 510 causes the member 504 to rotate around the joint 506.

Figure 5B:
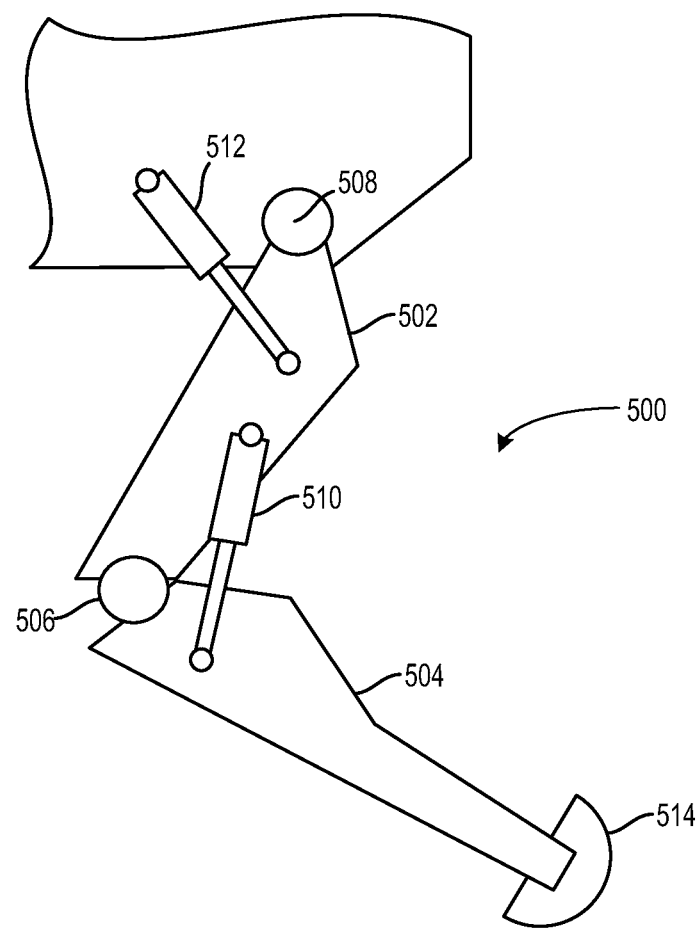
FIG. 5B is a side-view of the example robotic leg in a second arrangement.

Actuating the linear hydraulic actuator 510 and the linear hydraulic actuator 512 in combination may cause the leg to take a step. For instance, linear hydraulic actuator 510 may retract, which causes member 504 to rotate counter-clockwise around joint 506. This rotation may raise the leg 500 up from the ground, as shown in FIG. 5B. Linear hydraulic actuator 512 may then retract, which causes member 502 to rotate clockwise around joint 508. By rotating member 502 clockwise around joint 508, foot member 514 moves forward relative to the ground. Linear hydraulic actuators 510 and 512 may then extend and thereby cause leg 500 to lower and push against the ground, thereby causing the robotic device to move forward.

The locomotion system 418 may move the robotic device 400 according to a gait. The gait is a pattern of movement of the legs of the robotic device. The pattern of movement may involve a cyclical sequence of actuations by the hydraulic actuators. During a cycle of the gait, each leg may perform a stepping sequence, such as the stepping sequence described above. For instance, a bipedal robot may step a right leg and then a left leg during one cycle of a gait. Alternatively, the bipedal robot may move the right leg and the left leg at the same time, perhaps in a relatively faster gait.

The robotic device may alternate between several different gaits. For instance, a bipedal robot may alternate between a walking gait and a running gait. A quadruped robot may alternate between a walk, a run, and a gallop, among other possible gaits. The robotic device may move according to different gaits by varying the timing of actuation, speed of actuation, and range of actuation of the hydraulic actuators. The particular gaits that a particular robotic device is capable of performing may depend upon the range of motion of its legs and the robotic device's ability to actuate the hydraulic actuators with sufficient acceleration. The range of motion of its legs may in turn depend upon the leg length and range of travel of the linear actuators. Acceleration of the actuators is proportional to the pressure of the hydraulic fluid used to actuate the hydraulic actuator—with a given load, higher pressure results in greater acceleration. The control system may select a particular gait based on factors such as speed, terrain, the need to maneuver, and/or energy efficiency. For instance, the robotic device may transition from a walk to a run as speed of locomotion is increased. The robotic device may then transition back to a walk on uneven terrain.

Load on the hydraulic actuators may vary during the stepping sequence. During the portion of the gait in which the hydraulic actuators are causing a leg to push against the ground, the load on the hydraulic actuators is relatively large compared to the portion of the gait in which the hydraulic actuators are raising the leg and stepping forward. As the load varies, the robotic device may vary the pressure supplied by the hydraulic drive system to maintain the movement of the legs according to the gait.

Figure 6:
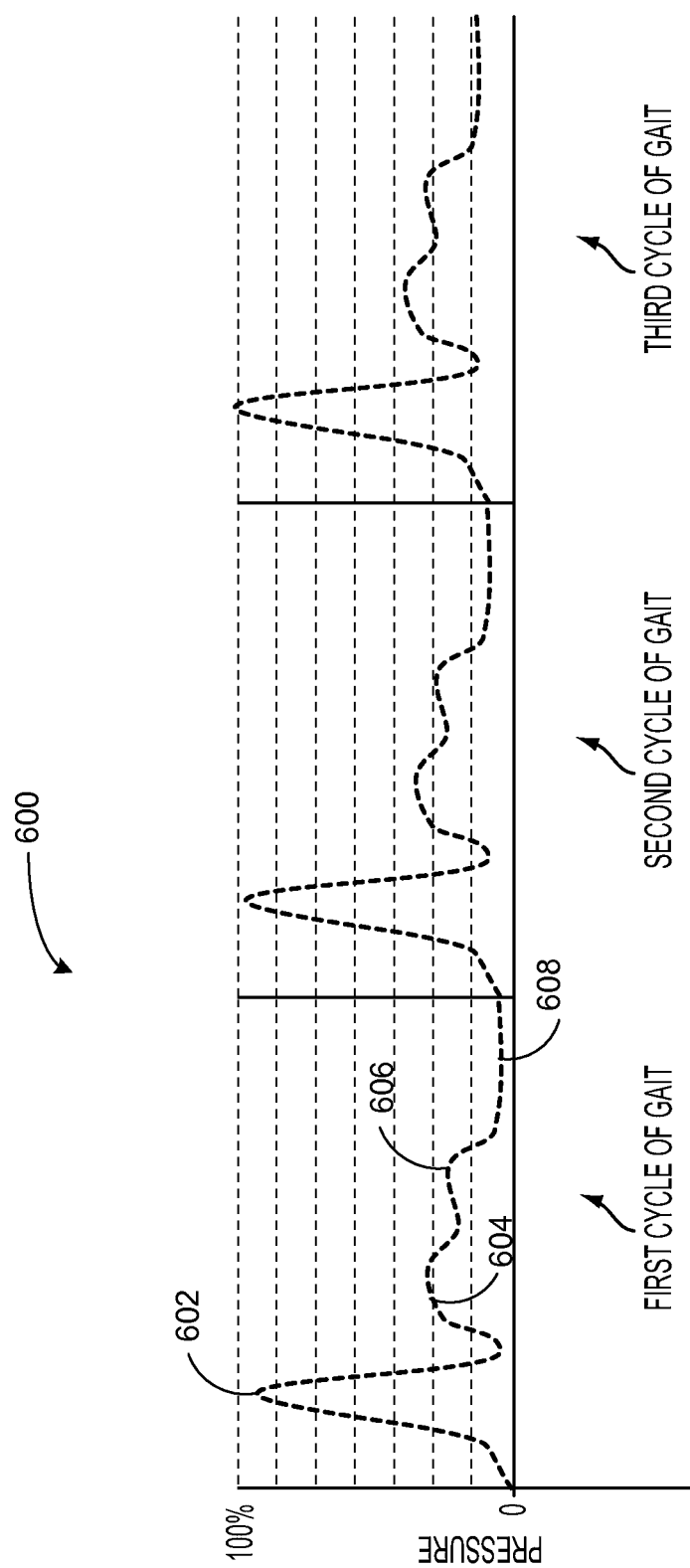
FIG. 6 is a chart illustrating energy usage by an example legged robotic device while walking according to a gait.

FIG. 6 shows a plot 600 representing combined load on hydraulic actuators of a given leg of a robotic device during three cycles of a gait. The x-axis of the plot is time and the y-axis is relative force. Point 602 on the plot 600 represents the load on the hydraulic actuators during the portion of the gait in which the hydraulic actuators are causing a leg to push against the ground. Point 604 represents the load on the hydraulic actuators during the portion of the gait in which the hydraulic actuators are picking up the leg. Point 606 represents the load on the hydraulic actuators during the portion of the gait in which the hydraulic actuators are stepping the leg forward. And point 608 represents the load on the hydraulic actuators during the portion of the gait in which the hydraulic actuators are lowering the leg to the ground. These loads repeat over time as the pattern of movements of the gait are repeated.

Returning to FIG. 4, the sensing system 410 may include sensors arranged to sense aspects of the robotic device 400 and the environment in which the robotic device 400 is operating. The sensing system 410 may connect to the control system 402 and thereby provide the control system 402 with data from the sensors. The control system 402 may track and store this sensor data and make operational determinations based on the tracked sensor data.

As noted above, the sensing system may include sensors arranged to sense aspects of the robotic device. The sensing system 410 may include one or more force sensors arranged to measure load on various components of the robotic device. In one example, the sensing system may include one or more force sensors on each leg. Such force sensors on the legs may measure the load on the hydraulic actuators that actuate the members of the leg.

A force sensor on a leg may detect slippage of the leg. For instance, relatively rapid decreases in load on a leg may indicate a slip of the leg. The control system 402 may increase the adjustable pressure based on the slippage of the at least one leg. For instance, the control system 402 may increase the pressure at a pressure rail by a pre-determined amount in response to detecting a pre-determined number of slips.

The sensing system 410 may include one or more pressure sensors. One or more pressure sensors may measure the pressure of the hydraulic fluid supplied to the hydraulic actuators. For instance, the sensing system 410 may include a pressure sensor on each pressure rail.

The sensing system 410 may include one or more position sensors. Position sensors may sense the position of the hydraulic actuators of the robotic device. Position sensors may also sense the positions of the hydraulic actuators. In one implementation, position sensors may sense the extension or retraction of the hydraulic actuators on the legs of the robotic device.

The sensing system 410 may include one or more position, velocity, or acceleration sensors. For instance, the sensing system 410 may include an inertial measurement unit (IMU). The inertial measurement unit may sense the robotic device's velocity, orientation, and acceleration. The sensing system may include one or more global positioning system (GPS) devices. The GPS may sense the robotic device's absolute position. The control system may use GPS data to determine the robotic device's speed or direction, possibly in combination with data from the IMU.

The sensing system 410 may include one or more perception sensors arranged to sense the environment in which the robotic device 400 is operating. One or more of the perception sensors may be mounted on the robotic device 400 and oriented in the direction of locomotion. Such sensors may sense physical features of the environment, such as the terrain, vegetation, man-made objects and structures, and the like. The control system 402 may vary the pressure at a pressure rail based on data indicating the environment in the direction of locomotion. For instance, the robotic device may increase pressure at a pressure rail in response to detecting that there are one or more physical features in the direction of locomotion.

In some implementations, the perception sensors may include one or more lidar systems. Such lidar systems may generate data indicating a map or model of the physical features of the environment, which may then be used by the control system to navigate the robotic device, perhaps in combination with sensor data from the other sensors.

In some implementations, the perception sensors may include one or more cameras, such as one or more stereo cameras. For example, one or more stereo cameras may generate three-dimensional images of the physical features of the environment. The control system may evaluate the three-dimensional images to identify the physical features and their position relative to the robotic device.

The perception sensors may also include one or more range finders, such as one or more laser range finders, which may generate data indicating distances from the robotic device to the physical features of the environment. The sensing system 410 may include other types of perception sensors as well.

The communication system 420 may include one or more wired or wireless communication interfaces that operate according to one or more communications protocols to facilitate data communications between the robotic device and other devices. For example, the communication system 420 may include a Wi-Fi communication component that is configured to facilitate wireless data communication according to one or more IEEE 802.11 protocols. Alternatively, the communication system 420 may include a cellular radio communication component that is configured to facilitate wireless communication (voice and/or data) with a cellular wireless base station to provide mobile connectivity to a network. Many other communication interfaces are known and available and the robotic device may include any suitable communication interface.

Figure 7:
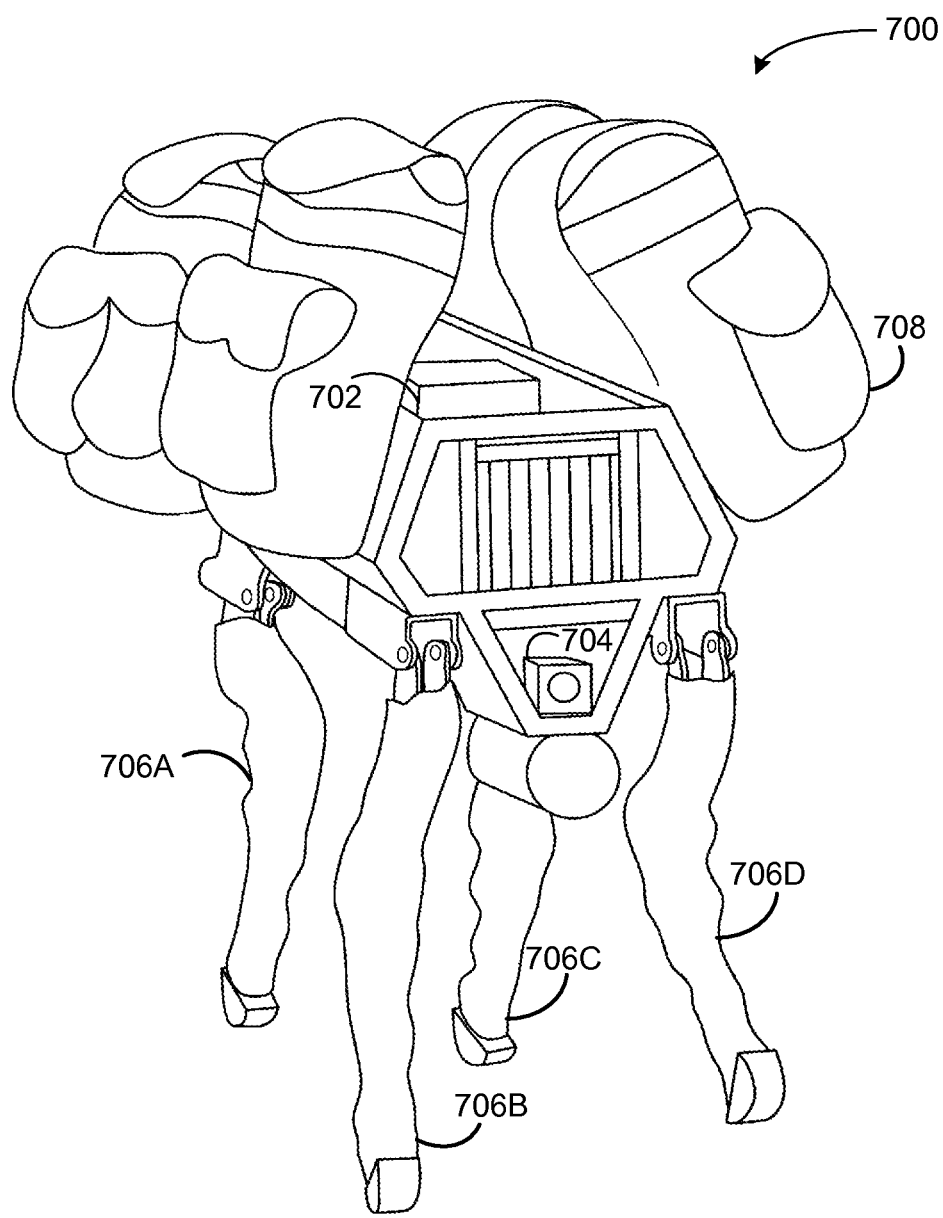
FIG. 7 is a perspective view of an example legged robotic device.

FIG. 7 is a perspective view of an example legged robotic device 700. Robotic device 700 includes a control system 702, a hydraulic drive system (not shown), a locomotion system that includes legs 706A, 706B, 706C, and 706D, and a sensing system, of which perception sensor 704 is shown. Robotic device 700 is carrying a load 708.

Control system 702 of robotic device 700 may cause the robotic device 700 to navigate an environment based on sensor data from the sensing system. The sensing system may include sensors of sensing system 410 (e.g., perception sensor 704). The robotic device 700 may receive navigation commands by way of the communication system 420. For instance, the robotic device may receive a command to move forward at 5 kilometers per hour. The command may specify to walk forward for a particular distance, such as 100 meters.

In some examples, the navigation commands may involve GPS coordinates. In one instance, a command may instruct the robotic device to navigate to a particular position, which may be defined by particular GPS coordinates. The robotic device may then cause the locomotion system to move to the position while navigating physical features of the terrain identified by the control system (perhaps based on data from the perception sensors). Another command may instruct the robotic device to follow a particular person, who may have with them a GPS enabled device that generates data indicating the position of the person. The data may be communicated to the robotic device which may then cause the locomotion system to follow the person while navigating physical features of the terrain identified by the control system.

Figure 8:
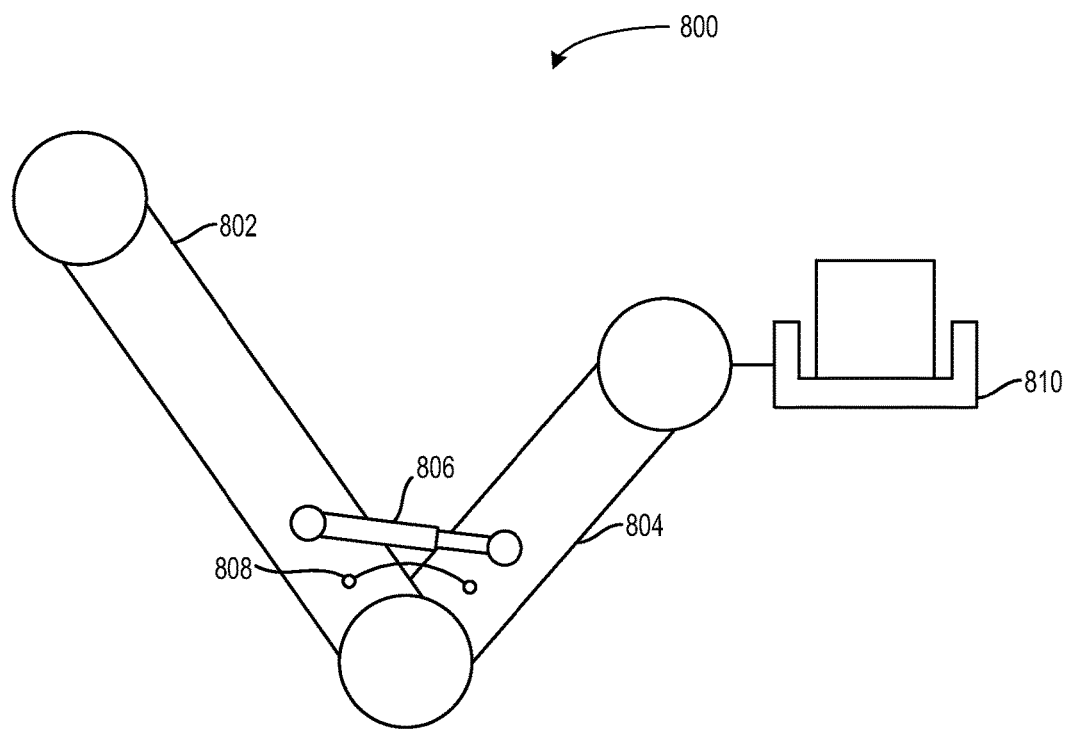
FIG. 8 is a side-view of an example robotic arm.

In some cases, the robotic device may include a robotic manipulator, such as a robotic arm. FIG. 8 is a side-view of an example articulable robotic arm 800 that includes a member 802 coupled to a member 804. A linear hydraulic actuator 806 may cause the member 804 to rotate relative to the member 804. The robotic arm 800 also includes an end effector 810 that may pick up an object.

The robotic arm 800 also includes a force sensor 808 that generates data indicating the load on the linear hydraulic actuator 806. Based on such data, a control system, such as control system 402, may vary the pressure at a pressure rail in proportion to the load on the on the linear hydraulic actuator 806.

Figure 9:
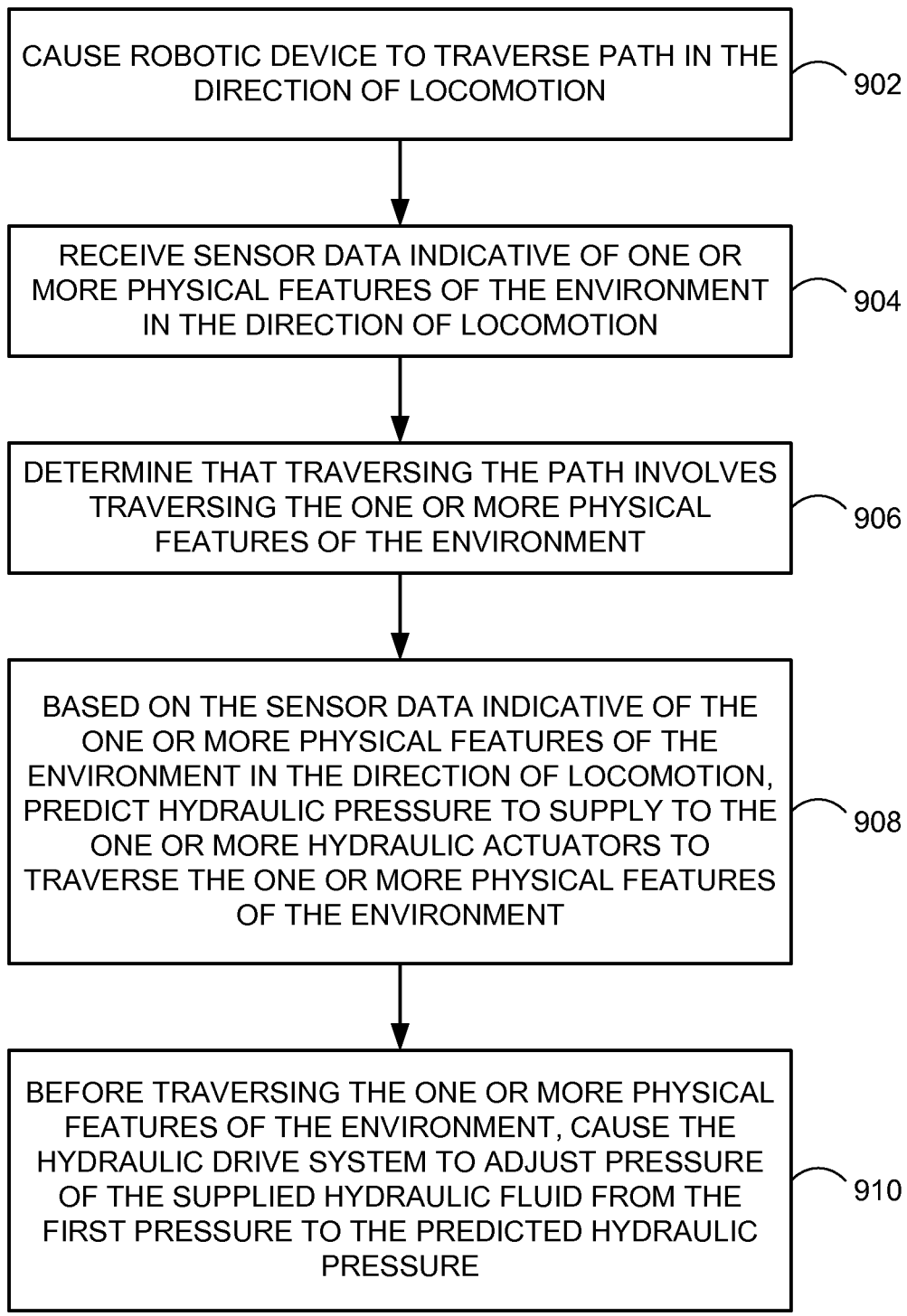
FIG. 9 is a flow chart illustrating an example method for adjusting hydraulic fluid pressure of a hydraulic drive system to a predicted pressure.

FIG. 9 is a flow chart illustrating example operation of a hydraulic drive system. These operations, for example, could be used with the hydraulic drive system 100 in FIG. 1, the robotic device 400 in FIG. 4, and/or the robotic device 700 in FIG. 7, for example, or may be performed by a combination of any components of the hydraulic drive system 100 in FIG. 1, the robotic device 400 in FIG. 4, or the robotic device 700 in FIG. 7. FIG. 9 may include one or more operations, or actions as illustrated by one or more of blocks 902-910. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for FIG. 9 and other processes and methods disclosed herein, the flow chart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and random access memory (RAM). The computer-readable medium may also include other non-transitory media, such as secondary or persistent long term storage, like read only memory (ROM), optical or magnetic disks, compact-disc read only memory (CD-ROM), for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media.

In addition, for FIG. 9 and other processes and methods disclosed herein, each block may represent circuitry that is arranged to perform the specific logical functions in the process.

Functions of FIG. 9 may be fully performed by a control system, or may be distributed across multiple control systems. In some examples, the control system may receive information from sensors of a robotic device, or the control system may receive the information from a processor that collects the information. The control system could further communicate with a remote control system (e.g., a control system on another robotic device) to receive information from sensors of other devices, for example.

At block 902, a robotic device may traverse a path in a direction of locomotion. For instance, the control system 402 may cause the robotic device 400 to traverse a path.

The robotic device 400 may receive a command instructing the robotic device 400 to move forward (e.g., by walking or running). The path may then extend forward. Alternatively, the robotic device 400 may receive a command instructing the robotic device 400 to move to the right by 100 meters. The path may then extend to the right by 100 meters. Other examples are possible as well.

In other cases, the path may be based a difference between a destination and a current location, perhaps defined by two or more sets of GPS coordinates. For instance, the control system 402 may receive a command to move to a destination, which may be indicated by a set of GPS coordinates. The robotic device may then retrieve its current location from a GPS sensor, such as a GPS sensor of sensing system 410. Based on the destination and the current location, the control system 402 may determine a path extending between the current location and the destination. The control system may then cause locomotion system 418 to move the robotic device 400 along the determined path.

Alternatively, the path may be based on a series of GPS coordinates that define a path. For example, the control system 402 may receive data that indicates a series of GPS coordinates that include locations in between approximately the robot's current location and a destination. Based on the data indicating the series of GPS coordinates, the robotic device may navigate to destination by way of the locations indicated by the GPS coordinates.

Traversing the path may involve causing a hydraulic drive system to supply hydraulic fluid at a first pressure to one or more hydraulic actuators. For instance, the control system 402 may cause hydraulic pump complex 412 and switch valve complex 414 to supply hydraulic fluid to one or more hydraulic actuators of the locomotion system 418. The one or more hydraulic actuators may be coupled between members of one or more articulable legs, such as articulable leg 500 in FIG. 5A and FIG. 5B.

At block 904, sensor data indicative of one or more physical features of the environment in the direction of locomotion may be received. For instance, control system 402 may receive sensor data from one or more perception sensors, such as one or more perception sensors of sensing system 418. At least one of the perception sensors of sensing system 418 may be oriented in the direction of locomotion (e.g., forward), such that the sensor data indicates one or more physical features in the direction of locomotion.

The sensor data may include lidar data from one or more lidar systems. The lidar data may indicate a three-dimensional (3D) map of one or more physical features. The 3D map may indicate relative distances from the robotic device to the one or more physical features of the environment. The lidar data may be correlated with range finder, IMU and/or GPS data indicating the position of the robotic device to determine absolute positions of the one or more physical features.

The sensor data may include imaging data from one or more stereo cameras. The imaging data may represent one or more 3D images of one or more physical features of the environment. The control system 402 may evaluate the 3D images to determine relative distances from the robotic device to the one or more physical features of the environment. The imaging data may be correlated with range finder, IMU, and/or GPS data indicating the position of the robotic device to determine absolute positions of the one or more physical features.

At block 906, the implementation may involve determining that traversing the path involves traversing the one or more physical features of the environment. For instance, the control system 402 may compare the path (which may involve two or more locations and an interconnection between them) to the respective relative or absolute positions of the one or more physical features of the environment.

At block 908, a hydraulic pressure to supply to the one or more hydraulic actuators to traverse the one or more physical features of the environment may be predicted. For instance, based on the sensor data indicative of the one or more physical features of the environment in the direction of locomotion, the control system 402 may predict a hydraulic pressure to supply to the one or more hydraulic actuators to traverse the one or more physical features of the environment.

In some cases, the control system 402 may predict the hydraulic pressure based on a determined actuation pressure. For example, the control system 402 may determine actuation pressure and then scale the determined actuation pressure up or down based on the number, size, and/or nature of the one or more physical features. In one example, the control system 402 may determine that that the number, size, and/or nature of the one or more physical features indicate a first type of terrain (e.g., uneven terrain). The control system 402 may then scale the determined actuation pressure by a first pre-determined factor for uneven terrain. In another example, the control system 402 may determine that that the number, size, and/or nature of the one or more physical features indicate a second type of terrain (e.g., even terrain). The control system 402 may then scale the determined actuation pressure by a second pre-determined factor for even terrain.

Actuation pressure may be proportional to the load on the hydraulic actuator and the acceleration of the hydraulic actuator (i.e., the rate of actuation). Actuation pressure is inversely proportional to the area or size of the actuator. The following formulas are illustrative:

$$\text{pressure} = \frac{\text{force}}{\text{area}} = \frac{\text{mass} \times \text{acceleration}}{\text{area}} = \frac{\text{load} \times \text{acceleration}}{\text{area}}$$

A control system, such as control system 402 in FIG. 4, may determine the actuation pressure based on a load on one or more hydraulic actuators of a robotic device. The control system may receive data from force sensors indicating the magnitude of the load on the one or more hydraulic actuators. The control system may then determine the actuation pressure to actuate the load based on the magnitude of the load. As the load increases, greater pressure is needed to actuate the load at a given rate. Conversely, if the load decreases, less pressure is needed to actuate the load at the given rate.

In some cases, the area (or size) of the hydraulic actuator is fixed for a particular robotic device. For instance, the robotic device may include one or more piston-cylinder hydraulic actuators having a fixed diameter. However, in other cases, the robotic device may include a recruiting actuator. A recruiting actuator may increase or decrease its area, such as by enabling additional piston-cylinder assemblies.

The determined actuation pressure may also be proportional to the desired acceleration of the one or more hydraulic actuators. Different operations may involve accelerating the one or more hydraulic actuators at different rates. For instance, causing the hydraulic actuators to move the legs according to a walking gait at two kilometers per hour may involve less acceleration than causing the hydraulic actuators to move the legs according to the walking gait at three kilometers per hour, as the movements of the actuators may speed up to cause the increased walking speed. Likewise, a running gait may involve greater acceleration of the hydraulic actuators than the walking gait.

The control system may maintain or have access to data that defines the series of actuations that create a gait. The data may define different series of actuations for different gaits, such as a walking gait or a running gait. For a given gait, the control system may scale the series of actuations to the desired speed—a higher speed requires quicker actuations (i.e., greater acceleration of the actuator).

In some implementations, predicting the hydraulic pressure may involve pattern matching the one or more physical features to known physical features (which may be represented by data to which the control system 402 maintains or has access). Pattern matching may involve the control system comparing the perception sensor data (e.g., lidar data or stereo camera data) to the data representing the known physical features.

At block 910, the hydraulic drive system may adjust pressure of the supplied hydraulic fluid from the first pressure to the predicted hydraulic pressure before traversing the one or more physical features of the environment. For instance, hydraulic pump complex 412 may provide the predicted hydraulic pressure at a pressure rail, such as the pressure rail that previously was at the first pressure.

Figure 10:
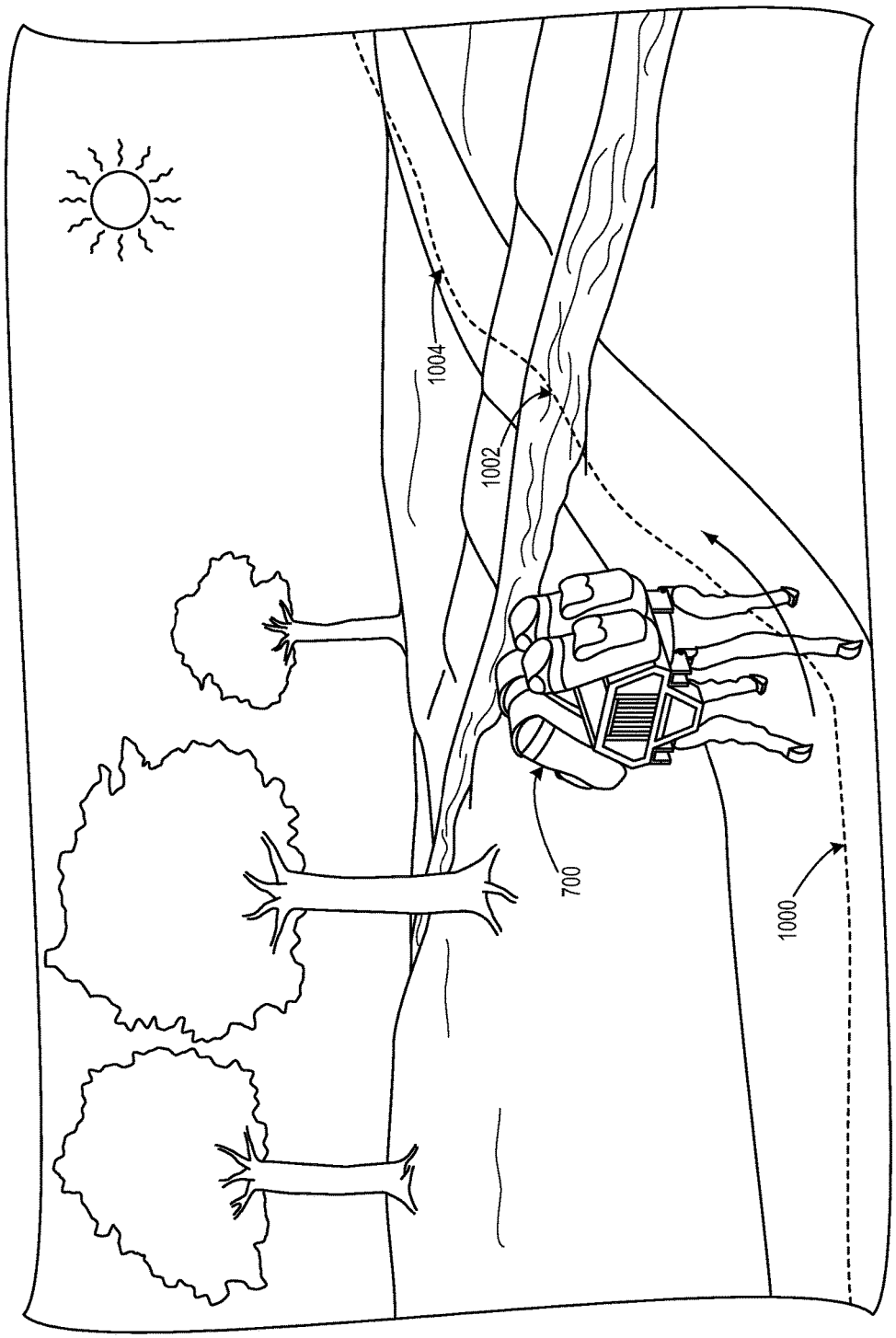
FIG. 10 shows the example legged robotic device traversing a path that includes even and uneven terrain.

FIG. 10 shows the example legged robotic device 700 traversing a path 1000 in a direction of locomotion. The path 1000 includes (relatively) uneven terrain 1002 (i.e., a stream) and (relatively) even terrain 1004 (i.e., a trail). Although a stream and a trail are shown as examples of uneven and even terrain respectively, many other examples of relatively uneven and relatively even terrain are possible. Control system 402 (which may be implemented in robotic device 700 as control system 702) may cause a hydraulic drive system (not shown) to supply pressurized hydraulic fluid to hydraulic actuators on the legs of robotic device 700, which may cause the robotic device to traverse the path 1000.

Path 1000 intersects uneven terrain 1002, as shown. Uneven terrain 1002 includes a stream, as shown. Control system 402 may have access to data that represents the location of uneven terrain 1002. Control system 402 may determine that path 1000 (perhaps represented by data that control system 402 maintains or has access to) intersects (or approximately intersects, such as by less than 1 meter) the uneven terrain 1002. As shown, traversing path 1000 involves traversing uneven terrain 1002. The control system 402 may then predict a hydraulic pressure for traversing uneven terrain 1002, and then adjust pressure to the predicted hydraulic pressure.

Figure 11:
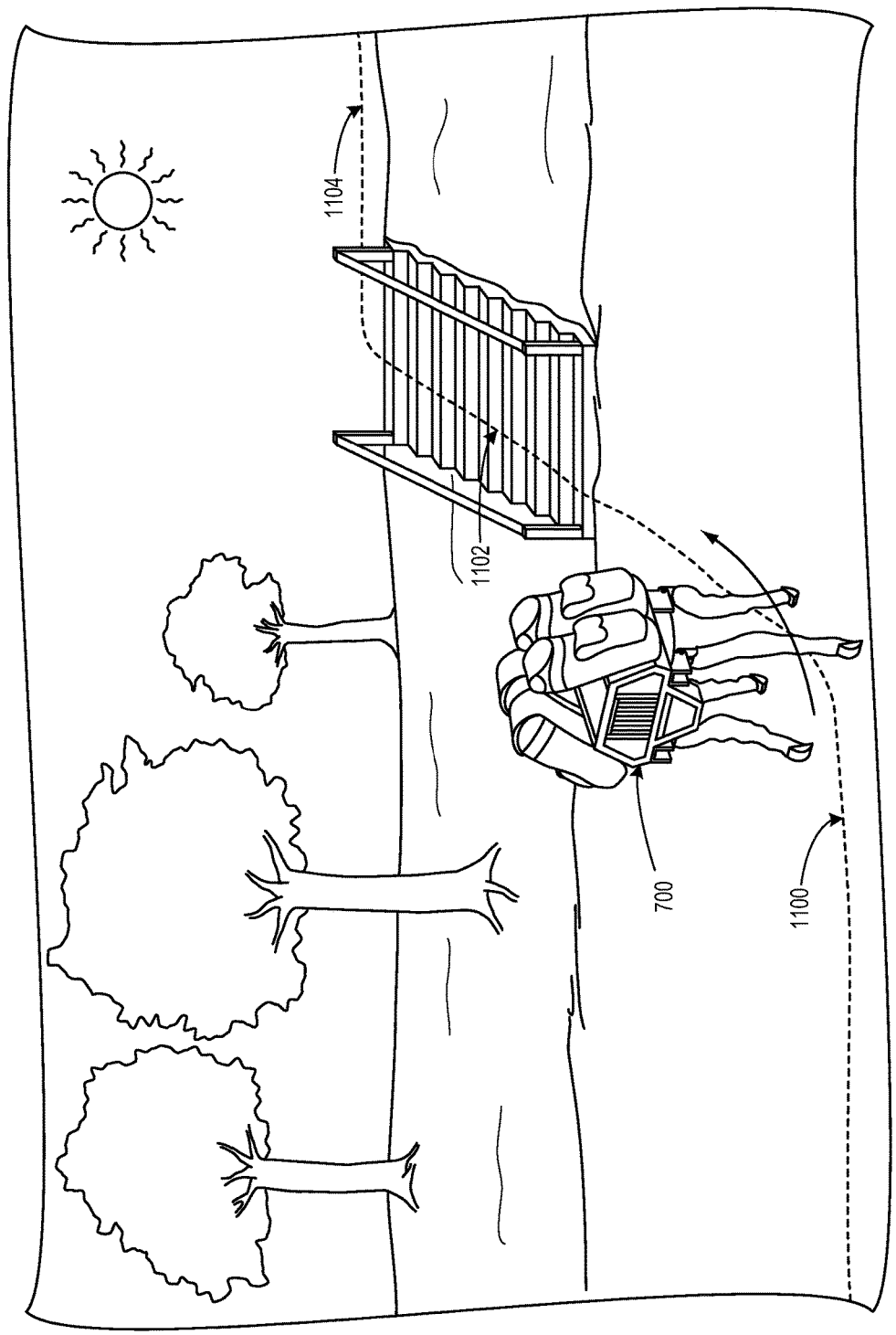
FIG. 11 shows the example legged robotic device traversing a path that includes a staircase.

In another instance, based on the data indicative of one or more physical features of the environment, the control system 402 may determine that the one or more physical features include a set of stairs. FIG. 11 shows the example legged robotic device 700 traversing a path 1100 that includes a staircase 1102 (i.e., a set of stairs) and also some even terrain 1104 (relative to the staircase 1102). In some cases, a set of stairs (such as the staircase 1102) may follow a predictable pattern of one or more steps having a rise and a run, which may create a relatively distinct pattern of planes and edges compared to the environment surrounding the stairs. The control system 402 may determine that the sensor data indicates such a set of stairs. Based on this determination, the control system 402 may select a pre-determined hydraulic pressure for stair-climbing as the predicted hydraulic pressure. Alternatively, the control system 402 may scale the determined actuation pressure by a pre-determined factor for stair climbing. In some cases, the hydraulic pressure may be based on the ratio of the stair rise to the stair run. For instance, a higher ratio of stair rise to stair run may indicate a greater hydraulic pressure than a lower ratio.

In another example, based on the data indicative of one or more physical features of the environment, the control system 402 may determine that the one or more physical features include paved terrain. Referring to FIG. 10, path 1000 includes paved terrain 1004. In some circumstances, paved terrain may be relatively smoother compared to unpaved terrain. The control system 402 may determine that the sensor data indicates paved terrain. Based on this determination, the control system 402 may select a pre-determined hydraulic pressure for paved terrain as the predicted hydraulic pressure. Alternatively, the control system 402 may scale the determined actuation pressure by a pre-determined factor for paved terrain.

Figure 12:
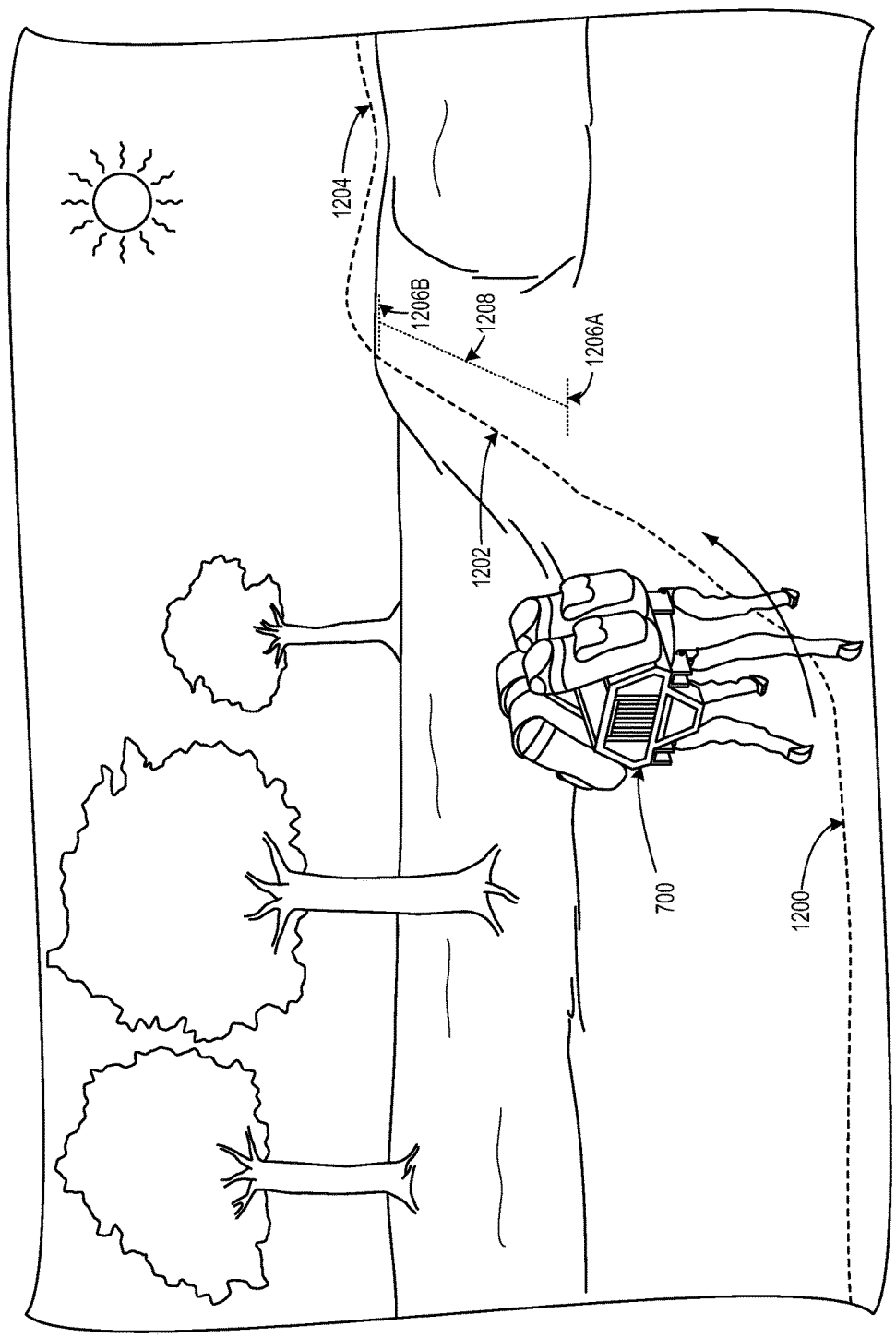
FIG. 12 shows the example legged robotic device traversing a path that includes an incline.

In a further example, based on the data indicative of one or more physical features of the environment, the control system 402 may determine that the one or more physical features include an incline. FIG. 12 shows the example legged robotic device 700 traversing a path 1200 that includes an incline 1202 and also some even terrain 1204 (relative to the incline 1202).

Based on the data indicative of one or more physical features of the environment, the control system 402 may estimate a gradient of the incline. For instance, the control system 402 may determine the change in horizontal elevation 1208 between the bottom of the incline 1206A to the top of the incline 1206B. The control system 402 may also determine the change in horizontal distance from the bottom of the incline 1206A to the top of the incline 1206B. The control system may then determine that the gradient is the change in horizontal elevation 1208 divided by the change in horizontal distance from the bottom of the incline 1206A to the top of the incline 1206B.

After estimating the gradient of the incline, the control system 402 may determine a hydraulic pressure for the one or more hydraulic actuators to cause one or more legs to traverse the incline. The determined hydraulic pressure may be in proportion to the gradient of the incline. For instance, the determined hydraulic pressure may scale up by a greater degree when the gradient is relatively steeper. In some cases, such a determined hydraulic pressure may then be selected as the predicted hydraulic pressure. In other cases, the control system 402 may adjust the determined hydraulic pressure based on the determined actuation pressure. The adjusted pressure may then be the predicted hydraulic pressure.

In other examples, the predicted hydraulic pressure may be determined based on data indicating past loads on similar types of physical features as the one or more physical features. A table or other data structure may store data indicating such past loads. The control system 402 may access to such data, which may facilitate determining the predicted actuation pressure. For instance, based on the data indicative of one or more physical features of the environment, the control system 402 may determine that the one or more physical features include uneven terrain. Then, based on data indicating past load on the one or more hydraulic actuators in traversing uneven terrain, the control system 402 may determine a second hydraulic pressure to actuate the past load on the one or more hydraulic actuators. For instance, the control system 402 may adjust pressure involve in actuating the past load based on the determined actuation pressure. Then, responsive to the robotic device traversing the uneven terrain, the control system 402 may select the determined second hydraulic pressure as the predicted hydraulic pressure.

Adjustment of the supplied hydraulic fluid from the first pressure to the predicted hydraulic pressure may take a finite amount of time. The duration of time for adjustment may depend upon the magnitude of the difference between the first pressure and the predicted hydraulic pressure. For instance, a larger magnitude of adjustment may take longer than an adjustment with a smaller magnitude. In some cases, the control system 402 may time the adjustment such the adjustment of the supplied hydraulic fluid completes at approximately the same time that the robotic device begins to traverse the one or more physical features.

For instance, the control system 402 may determine a duration of adjustment to adjust hydraulic pressure from the first pressure to the predicted hydraulic pressure. The duration of adjustment may be based on the magnitude of the adjustment and the rate at which the hydraulic pump complex 412 adjusts the hydraulic pressure.

Further, based on the data indicative of one or more physical features of the environment, the control system 402 may estimate distance between the robotic device 400 and the one or more physical features of the environment. For instance, the control system 402 may estimate distance based on range finder data indicating the distance between the robotic device 400 and the one or more physical features and also based on the rate of locomotion of the robotic device 400. The robotic device may then determine that the robotic device will arrive at the one or more physical features of the environment in approximately the determined duration of adjustment.

Thereafter, in response to determining that the robotic device will reach the one or more physical features in approximately the determined duration of adjustment, the control system 402 may cause the hydraulic drive system to adjust hydraulic pressure to the predicted hydraulic pressure. The robotic device may initiate the adjustment such that the hydraulic pressure is adjusted to the predicted hydraulic pressure at approximately the same time that the robotic device arrives at the one or more physical features.

Figure 13:
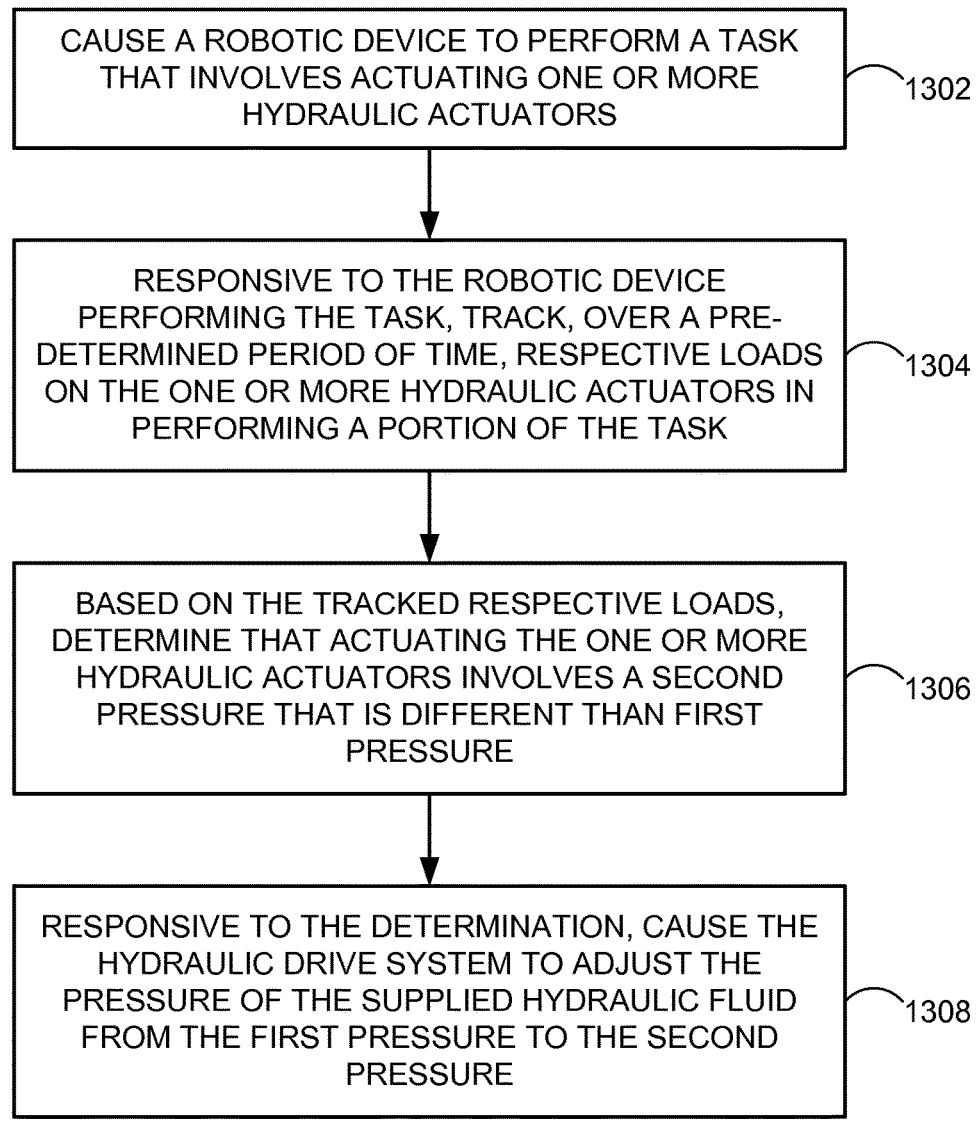
FIG. 13 is another example method for adjusting hydraulic fluid pressure of a hydraulic drive system to a predicted pressure.

FIG. 13 is a flow chart illustrating example operation of a hydraulic drive system. These operations, for example, could be used with the hydraulic drive system 100 in FIG. 1, the robotic device 400 in FIG. 4, and/or the robotic device 700 in FIG. 7, for example, or may be performed by a combination of any components of the hydraulic drive system 100 in FIG. 1, the robotic device 400 in FIG. 4, or the robotic device 700 in FIG. 7. FIG. 13 may include one or more operations, or actions as illustrated by one or more of blocks 1302-1308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for FIG. 13 and other processes and methods disclosed herein, the flow chart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and RAM. The computer-readable medium may also include other non-transitory media, such as secondary or persistent long term storage, like ROM, optical or magnetic disks, CD-ROM, for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media. For instance, the commands may be received on a wireless communication media, for example.

In addition, for FIG. 13 and other processes and methods disclosed herein, each block may represent circuitry that is arranged to perform the specific logical functions in the process.

Functions of FIG. 13 may be fully performed by a control system, or may be distributed across multiple control systems. In some examples, the control system may receive information from sensors of a robotic device, or the control system may receive the information from a processor that collects the information. The control system could further communicate with a remote control system (e.g., a control system on another robotic device) to receive information from sensors of other devices, for example.

At block 1302, the robotic device may perform a task that involves actuating one or more hydraulic actuators. For instance, the control system 402 may cause the one or more hydraulic actuators (perhaps moving articulable legs, such as one or more legs 500 of FIG. 5A) of locomotion system 418 to move the robotic device (e.g., to walk or run). In moving, the robotic device may traverse a path. Alternatively, the control system 402 may cause a robotic manipulator, such as robotic manipulator 800, to pick up an object.

To actuate the one or more hydraulic actuators, a hydraulic drive system may supply hydraulic fluid at a first pressure to the one or more hydraulic actuators. For instance, hydraulic pump complex 412 and switch valve complex 414 may supply one or more hydraulic actuators of locomotion system 418 with hydraulic fluid pressurized at the first pressure. The control system 402 may determine the first pressure, perhaps based on load on the one or more hydraulic actuators and desired actuation.

At block 1304, respective loads on the one or more hydraulic actuators sustained in performing a portion of the task may be tracked. For instance, in response to the robotic device performing the task, the control system 402 may track, over a pre-determined period of time, respective loads on the one or more hydraulic actuators in performing a portion of the task. One or more force sensors of a sensing system, such as sensing system 410, may produce data indicating the load. For example, the force sensor 808 may produce data indicating load on the hydraulic actuator 806 while the robotic device is picking up an object with robotic arm 800. The control system 402 may then track the load on the hydraulic actuator 806 borne in picking up the object.

As noted above, in some instance, the control system 402 may cause the robotic device to move, which may involve traversing a path. In such an instance, the control system 402 may track the respective loads on the respective hip actuators and the respective knee actuators over a predetermined period of time, such as a period of time under ten minutes. Alternatively, the control system 402 may track respective loads on the respective hydraulic actuators over a portion of the path.

At block 1306, based on the tracked respective loads, the implementation may involve determining that actuating the one or more hydraulic actuators involves a second pressure that is different than the first pressure. For example, the control system 402 may determine that the loads involve less hydraulic pressure, as the loads born by the hydraulic actuators are not as great as first determined.

At block 1308, the hydraulic drive system may adjust pressure of the supplied hydraulic fluid from the first pressure to the second pressure. For instance, the control system 402 may reduce pressure of the supplied hydraulic fluid from the first pressure to the second pressure.

In one example, the control system 402 may determine that the first pressure is greater than a second pressure indicated by load on the one or more hydraulic actuators. For instance, the control system 402 may predict a hydraulic pressure for uneven terrain, and the terrain may be more even than predicted. In such a circumstance, lower pressure might be sufficient to perform the task (e.g., navigating the terrain). In response to such a determination, the control system 402 may reduce pressure of the supplied hydraulic fluid from the first pressure to the second pressure.

Alternatively, the control system 402 may increase pressure of the supplied hydraulic fluid from the first pressure to the second pressure. For instance, the control system 402 may determine that the one or more legs have slipped at least once over the portion of the path, perhaps based on the tracked respective loads (e.g., rapid decreases in load which are followed by rapid increases in load may indicate slipping.) In response to the determination that the one or more legs have been slipping over the portion of the path, the control system 402 may cause the hydraulic drive system to adjust pressure of the supplied hydraulic fluid from the first pressure to a third pressure.

In another example, based on the tracked respective loads, the control system 402 may determine that picking up an object is saturating the first pressure. For instance, the object might be too heavy to actuate the hydraulic actuator 806. The control system 402 may then cause the hydraulic drive system to increase pressure of the supplied hydraulic fluid from the first pressure to a third pressure, perhaps in response to the determination that picking up the object is saturating the first pressure.

In some implementations, performing the task involves causing the one or more hydraulic actuators to follow respective task trajectories. For instance, a particular gait may involve respective task trajectories for the gait. As another example, picking up an object may involve tasks trajectories of a robotic manipulator in which hydraulic actuators of the robotic manipulator follow the task trajectories to grasp the object. Many examples of different respective task trajectories are possible for different tasks.

As the robotic device performs a task, the control system 402 may receive positional data from one or more sensors indicating respective trajectories of the one or more hydraulic actuators. The control system 402 may track the respective trajectories of the one or more hydraulic actuators in performing a portion of the task. Then, based on the tracked respective trajectories, determine one or more deviations of the respective tracked trajectories from the respective task trajectories. Such deviations from the task trajectories may indicate positional errors during the tasks. With some tasks, such as those involving delicate manipulation, such errors may cause issues in performing the task. In response to determining one or more deviations of the respective tracked trajectories from the respective task trajectories, the control system 402 may cause the hydraulic drive system to increase pressure of the supplied hydraulic fluid from the first pressure to a third pressure. The third, higher pressure may facilitate having the actual trajectories of the one or more hydraulic actuators follow the tasks trajectories for performing the task.

In some circumstances, the load borne by the one or more hydraulic actuators may be substantially cyclical. For instance, the one or more hydraulic actuators may cause the robotic device to move according to a gait, which may result in a substantially cyclical load. Referring back to FIG. 6, plot 600 represents three cycles of a gait. When plotted, the tracked respective loads may resemble plot 600 (albeit perhaps in terms of load, rather than force). The control system 402 may determine that such tracked respective loads are substantially cyclical.

Further, the tracked respective loads may vary from a minimum load to a maximum load during one or more cycles. For example, during the first cycle of the gait shown in FIG. 6, the force (which may be proportional to the load) varies from a maximum load at point 602 to a minimum load at point 608. The control system may then determine, as the second pressure at which to adjust the hydraulic drive system, an actuation pressure to actuate the maximum load.

Figure 14:
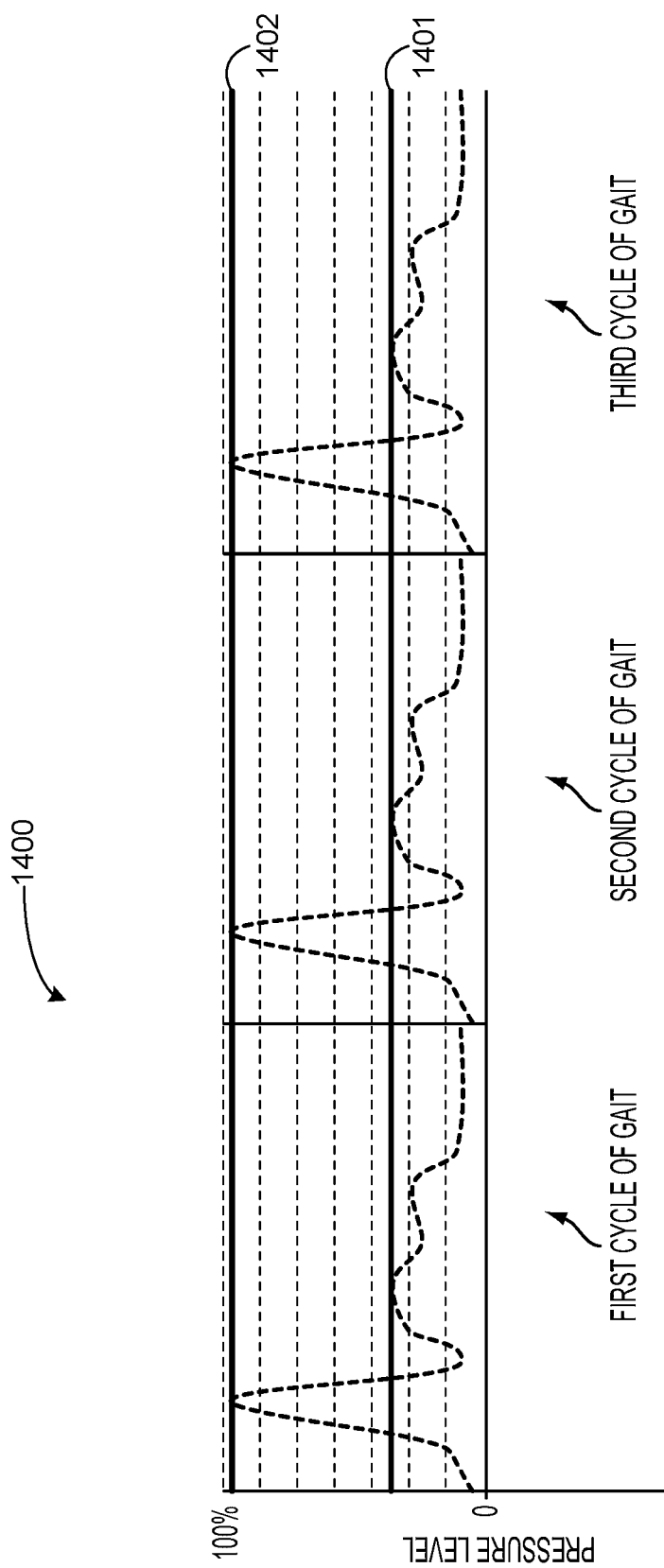
FIG. 14 is a chart illustrating pressure levels set by an example legged robotic device while walking according to a gait.

In another example, the control system 402 may adjust two or more pressure rails. Such adjustment may be used to tune the pressure rails to different portions of a cyclical load. FIG. 14 shows a plot 1400 of pressure levels used to actuate hydraulic actuators during the three cycles of the gait shown in FIG. 6. The control system 402 may adjust a first pressure rail to pressure level 1401. The first pressure rail may then be used to actuate the hydraulic actuators at desired pressures under pressure level 1401. The control system 402 may adjust a second pressure rail to pressure level 1402. The second pressure rail may then be used to actuate the hydraulic actuators at desired pressures under pressure level 1402 and above pressure level 1401. Some throttling from the pressure level 1401 and pressure level 1402 may occur to follow the plot 1400 of pressure levels. Such adjustment of the two pressure rails may improve the efficiency of the robotic device, by reducing the amount of throttling that occurs to follow the plot 1400 of pressure levels.

The arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A control system of a robotic device comprising:
a limb including a plurality of hydraulic actuators;
one or more processors; and
data storage configured to store instructions, that when executed by the one or more processors, cause the control system to:
 cause the robotic device to perform a task that involves actuating the plurality of hydraulic actuators, wherein causing the robotic device to perform the task comprises (i) causing a pump of a hydraulic drive system to supply hydraulic fluid at a first pressure to at least one of the plurality of hydraulic actuators, and (ii) causing the plurality of hydraulic actuators to follow respective task trajectories;
 during performance of the task, repeatedly track, over a pre-determined period of time, respective actuator trajectories of the plurality of hydraulic actuators that perform a portion of the task;

based on the tracked respective actuator trajectories, determine a plurality of deviations of the respective tracked actuator trajectories from the respective task trajectories;

after the pre-determined period of time and responsive to the determination of the plurality of deviations, predict, based on the tracked respective actuator trajectories, a second pressure with which to actuate the at least one of the plurality of hydraulic actuators during a subsequent portion of the task;

cause the pump of the hydraulic drive system to adjust pressure of the supplied hydraulic fluid from the first pressure to the second pressure during a non-instantaneous adjustment period before performing the subsequent portion of the task; and after the non-instantaneous adjustment period, cause the hydraulic drive system to supply hydraulic fluid at the second pressure to the at least one of the plurality of hydraulic actuators during the subsequent portion of the task.

2. The control system of claim 1, wherein the limb is a leg, wherein causing the robotic device to perform the task comprises causing the robotic device to traverse a path toward a destination, and wherein the instructions further cause the control system to:

track respective loads on the respective hydraulic actuators over a portion of the path;

based on the tracked respective loads, determine that the leg has slipped at least once over the portion of the path; and responsive to the determination that the leg has slipped over the portion of the path, cause the hydraulic drive system to increase pressure of the supplied hydraulic fluid to a third pressure.

3. The control system of claim 1, wherein the limb is a robotic manipulator, wherein causing the robotic device to perform the task comprises causing the robotic manipulator to pick up an object, wherein the robotic manipulator comprises the at least one hydraulic actuator, and wherein the instructions further cause the control system to:

track a load on the at least one hydraulic actuator borne in picking up the object;

determine that picking up the object is saturating the first pressure; and responsive to the determination that picking up the object is saturating the first pressure, cause the pump of the hydraulic drive system to increase pressure of the supplied hydraulic fluid to a third pressure.

4. The control system of claim 1, wherein the hydraulic drive system comprises a first pressure rail and a second pressure rail, and wherein the instructions further cause the control system to:

based on respective loads on the plurality of actuators, determine that the task involves a cyclical load on the plurality of actuators;

adjust the first pressure rail to the second pressure, wherein the second pressure is sufficient to actuate a first portion of the cyclical load; and adjust the second pressure rail to a third pressure, wherein the third pressure is sufficient to actuate a second portion of the cyclical load.

5. The control system of claim 4, wherein the cyclical load on the plurality of actuators is due to the robotic device moving according to a cyclic gait.

6. A method comprising:

causing, by one or more processors, a robotic device to perform a task that involves actuating a plurality of hydraulic actuators of the robotic device, wherein the plurality of hydraulic actuators are disposed upon a limb of the robotic device, and wherein causing the robotic device to perform the task comprises (i) causing a pump of a hydraulic drive system to supply hydraulic fluid at a first pressure to at least one of the plurality of hydraulic actuators, and (ii) causing the plurality of hydraulic actuators to follow respective task trajectories;

during performance of the task, repeatedly tracking, by the one or more processors over a pre-determined period of time, respective actuator trajectories of the plurality of hydraulic actuators that perform a portion of the task;

based on the tracked respective actuator trajectories, determining, by the one or more processors, a plurality of deviations of the respective tracked actuator trajectories from the respective task trajectories;

after the pre-determined period of time and responsive to the determination of the plurality of deviations, predict, based on the tracked respective actuator trajectories, a second pressure with which to actuate the at least one of the plurality of hydraulic actuators during a subsequent portion of the task;

causing, by the one or more processors, the pump of the hydraulic drive system to adjust pressure of the supplied hydraulic fluid from the first pressure to the second pressure during a non-instantaneous adjustment period before performing the subsequent portion of the task; and after the non-instantaneous adjustment period, causing, by the one or more processors, the hydraulic drive system to supply hydraulic fluid at the second pressure to the at least one of the plurality of hydraulic actuators during the subsequent portion of the task.

7. The method of claim 6, wherein the limb is a leg, and wherein causing the robotic device to perform the task comprises causing the robotic device to traverse a path toward a destination, the method further comprising:

tracking respective loads on the respective hydraulic actuators over a portion of the path;

based on the tracked respective loads, determining that the leg has slipped at least once over the portion of the path; and responsive to the determination that the leg has slipped over the portion of the path, causing the hydraulic drive system to increase pressure of the supplied hydraulic fluid to a third pressure.

8. The method of claim 6, wherein the limb is a robotic manipulator, wherein causing the robotic device to perform the task comprises causing the robotic manipulator to pick up an object, wherein the robotic manipulator comprises the at least one hydraulic actuator, and wherein the instructions further cause the control system to:

track a load on the at least one hydraulic actuator borne in picking up the object;

determining that picking up the object is saturating the first pressure; and responsive to the determination that picking up the object is saturating the first pressure, causing the pump of the hydraulic drive system to increase pressure of the supplied hydraulic fluid to a third pressure.

9. The method of claim 6, wherein the hydraulic drive system comprises a first pressure rail and a second pressure rail, the method further comprising:

based on respective loads on the plurality of actuators, determining that the task involves a cyclical load on the plurality of actuators;

adjusting the first pressure rail to the second pressure, wherein the second pressure is sufficient to actuate a first portion of the cyclical load; and adjusting the second pressure rail to a third pressure, wherein the third pressure is sufficient to actuate a second portion of the cyclical load.

10. The method of claim 6, wherein the cyclical load on the plurality of actuators is due to the robotic device moving according to a cyclic gait.

11. A non-transitory computer-readable medium, having stored thereon program instructions that, upon execution by one or more processors, cause a robotic device to perform operations comprising:

causing the robotic device to perform a task that involves actuating a plurality of hydraulic actuators of the robotic device, wherein the plurality of hydraulic actuators are disposed upon a limb of the robotic device, and wherein causing the robotic device to perform the task comprises (i) causing a pump of a hydraulic drive system to supply hydraulic fluid at a first pressure to at least one of the plurality of hydraulic actuators, and (ii) causing the plurality of hydraulic actuators to follow respective task trajectories;

during performance of the task, repeatedly tracking, over a pre-determined period of time, respective actuator trajectories of the plurality of hydraulic actuators that perform a portion of the task;

based on the tracked respective actuator trajectories, determining a plurality of deviations of the respective tracked actuator trajectories from the respective task trajectories;

after the pre-determined period of time and responsive to the determination of the plurality of deviations, predict, based on the tracked respective actuator trajectories, a second pressure with which to actuate the at least one of the plurality of hydraulic actuators during a subsequent portion of the task;

causing the pump of the hydraulic drive system to adjust pressure of the supplied hydraulic fluid from the first pressure to the second pressure during a non-instantaneous adjustment period before performing the subsequent portion of the task; and after the non-instantaneous adjustment period, causing the pump of the hydraulic drive system to supply hydraulic fluid at the second pressure to the at least one of the plurality of hydraulic actuators during the subsequent portion of the task.

12. The non-transitory computer-readable medium of claim 11, wherein the limb is a leg, and wherein causing the robotic device to perform the task comprises causing the robotic device to traverse a path toward a destination, the operations further comprising:

tracking respective loads on the respective hydraulic actuators over a portion of the path;

based on the tracked respective loads, determining that the leg has slipped at least once over the portion of the path; and responsive to the determination that the leg has slipped over the portion of the path, causing the hydraulic drive system to increase pressure of the supplied hydraulic fluid to a third pressure.

13. The non-transitory computer-readable medium of claim 11, wherein the limb is a robotic manipulator, wherein causing the robotic device to perform the task comprises causing the robotic manipulator to pick up an object, wherein the robotic manipulator comprises the at least one hydraulic actuator, and wherein the instructions further cause the control system to:

track a load on the at least one hydraulic actuator borne in picking up the object;

determining that picking up the object is saturating the first pressure; and responsive to the determination that picking up the object is saturating the first pressure, causing the pump of the hydraulic drive system to increase pressure of the supplied hydraulic fluid to a third pressure.

14. The non-transitory computer-readable medium of claim 11, wherein the hydraulic drive system comprises a first pressure rail and a second pressure rail, the operations further comprising:

based on respective loads on the plurality of actuators, determining that the task involves a cyclical load on the plurality of actuators;

adjusting the first pressure rail to the second pressure, wherein the second pressure is sufficient to actuate a first portion of the cyclical load; and adjusting the second pressure rail to a third pressure, wherein the third pressure is sufficient to actuate a second portion of the cyclical load.

15. The non-transitory computer-readable medium of claim 11, wherein the cyclical load on the plurality of actuators is due to the robotic device moving according to a cyclic gait.

* * * * *